US011286376B2

(12) United States Patent
Coe

(10) Patent No.: US 11,286,376 B2
(45) Date of Patent: Mar. 29, 2022

(54) PROCESS FOR REGENERATING A MONOLITHIC, MACRO-STRUCTURAL, INTER-PENETRATING ELASTOMER NETWORK MORPHOLOGY FROM GROUND TIRE RUBBER PARTICLES

(71) Applicant: William B. Coe, Wrightwood, CA (US)

(72) Inventor: William B. Coe, Wrightwood, CA (US)

(*) Notice: Subject to any disclaimer, the term of this patent is extended or adjusted under 35 U.S.C. 154(b) by 29 days.

(21) Appl. No.: 16/900,713

(22) Filed: Jun. 12, 2020

(65) Prior Publication Data
US 2020/0317894 A1 Oct. 8, 2020

Related U.S. Application Data

(60) Continuation of application No. 16/803,335, filed on Feb. 27, 2020, now Pat. No. 10,711,123, which is a division of application No. 16/497,775, filed as application No. PCT/US2018/028656 on Apr. 20, 2018, now Pat. No. 10,662,320.

(60) Provisional application No. 62/621,465, filed on Jan. 24, 2018, provisional application No. 62/613,744, filed on Jan. 4, 2018, provisional application No. 62/569,374, filed on Oct. 6, 2017, provisional application No. 62/541,610, filed on Aug. 4, 2017, provisional application No. 62/489,878, filed on Apr. 25, 2017.

(51) Int. Cl.
| *C08L 17/00* | (2006.01) |
| *B32B 25/04* | (2006.01) |
| *B32B 25/16* | (2006.01) |
| *B60C 1/00* | (2006.01) |
| *C04B 18/22* | (2006.01) |
| *C04B 26/26* | (2006.01) |
| *C08C 19/08* | (2006.01) |
| *C08C 19/20* | (2006.01) |
| *C08J 3/24* | (2006.01) |
| *C08J 5/18* | (2006.01) |
| *C08L 9/06* | (2006.01) |
| *C04B 111/00* | (2006.01) |

(52) U.S. Cl.
CPC ............ *C08L 17/00* (2013.01); *B32B 25/042* (2013.01); *B32B 25/16* (2013.01); *B60C 1/0016* (2013.01); *B60C 1/0025* (2013.01); *C04B 18/22* (2013.01); *C04B 26/26* (2013.01); *C08C 19/08* (2013.01); *C08C 19/20* (2013.01); *C08J 3/245* (2013.01); *C08J 5/18* (2013.01); *C08L 9/06* (2013.01); *B32B 2307/54* (2013.01); *B32B 2307/706* (2013.01); *B32B 2307/732* (2013.01); *B60C 2001/0066* (2013.01); *C04B 2111/0075* (2013.01); *C04B 2111/00586* (2013.01); *C08J 2309/06* (2013.01); *C08J 2317/00* (2013.01); *C08L 2203/12* (2013.01); *C08L 2203/16* (2013.01); *C08L 2207/02* (2013.01); *C08L 2207/24* (2013.01); *C08L 2312/00* (2013.01)

(58) Field of Classification Search
USPC ........................................................ 428/337
See application file for complete search history.

(56) References Cited

U.S. PATENT DOCUMENTS

| 5,742,943 | A  | 4/1998  | Chen |
| 6,268,427 | B1 | 7/2001  | Wang |
| 6,303,220 | B1 | 10/2001 | Materne |
| 6,313,220 | B1 | 10/2001 | Mateme |
| 7,425,584 | B2 | 9/2008  | McFarlane |
| 8,808,445 | B2 | 8/2014  | Coe |
| 8,926,742 | B2 | 1/2015  | Coe |
| 8,992,118 | B2 | 3/2015  | Coe |
| 9,057,163 | B1 | 6/2015  | Coe |
| 9,074,328 | B1 | 7/2015  | Coe |
| 9,127,413 | B2 | 9/2015  | Coe |
| 9,169,606 | B2 | 10/2015 | Coe |
| 9,347,187 | B2 | 5/2016  | Coe |
| 9,481,967 | B2 | 11/2016 | Coe |
| 9,551,114 | B2 | 1/2017  | Coe |
| 9,551,117 | B2 | 1/2017  | Coe |
| 9,624,625 | B2 | 4/2017  | Coe |
| 9,637,870 | B1 | 5/2017  | Coe |
| 10,626,275 | B2 | 4/2020 | Coe |
| 10,662,320 | B2 | 5/2020 | Coe |
| 10,711,123 | B2 | 7/2020 | Coe |
| 10,800,906 | B2 | 10/2020 | Coe |
| 2002/0077373 | A1 | 6/2002 | Hudson |
| 2006/0116431 | A1 | 6/2006 | McFarlane |
| 2010/0048752 | A1 | 2/2010 | Vignola et al. |
| 2010/0307380 | A1 | 12/2010 | Fader |
| 2010/0314162 | A1 | 12/2010 | Gardner |
| 2012/0048446 | A1 | 3/2012 | Kaszaz |
| 2012/0189819 | A1 | 7/2012 | Chang |
| 2015/0080504 | A1 | 3/2015 | Coe |

(Continued)

FOREIGN PATENT DOCUMENTS

WO    WO 12/007949    1/2012

OTHER PUBLICATIONS

Anthony, 2006, Technology to separate rubber crumb from fiber, Applied Engineering in Agriculture, 22(4):563-570.

*Primary Examiner* — Terressa Boykin
(74) *Attorney, Agent, or Firm* — Knobbe, Martens, Olson & Bear, LLP

(57) ABSTRACT

Crumb rubber obtained from recycled tires is subjected to an interlinked substitution process. The process utilizes a reactive component that interferes with sulfur bonds. The resulting treated rubber exhibits properties similar to those of the virgin composite rubber structure prior to being granulated, and is suitable for use in fabricating new tires, engineered rubber articles, and asphalt rubber for use in waterproofing and paving applications.

20 Claims, 12 Drawing Sheets

(56) References Cited

U.S. PATENT DOCUMENTS

| | | |
|---|---|---|
| 2015/0210839 A1 | 7/2015 | Mendoza |
| 2015/0247020 A1 | 9/2015 | Sekhar |
| 2019/0017233 A1 | 1/2019 | Coe |
| 2019/0033189 A1 | 1/2019 | Coe et al. |
| 2019/0055383 A1 | 2/2019 | Coe |
| 2020/0255666 A1 | 8/2020 | Coe |

ELEMENT ONE: An electro-mechanical reactor environment (EMRE) which provides an effective "Phase Space" environment to: 1) unpack the GTRP, re-set the vulcanization pre-cursor for 2) subsequent sulfidic bridge realignment, 3) with minimal alteration to the native, elastomer-filler matrix.

ELEMENT THREE: GTRP Traverses 'Phase Space Tunnel'; differential-cyclical, mechanical stress and steric field-polarization.

| TIMELINE | 0.000 sec | | +0.0007 sec | | +0.0012 sec | |
|---|---|---|---|---|---|---|
| LINEAR DISTANCE | ROTOR (0") | 0.50" | STATOR COMPRESSION | 0.25" | EXIT STATOR | ≤ 20' |
| GTRP GEOMETRY | d ≤ 600μ | | GTRP Enters Compression Gate w/l ≈ 3.1 | w/l ≈ 6.1 | w/l ≈ 3.1 | RECIRCULATION PATTERN* $d \leq [600\mu] - [(600)\left[\frac{1}{20}\right]] N$ |
| VELOCITY | GTRP Recirculation Speed 0.25 MPH | Tip Speed ~ 90 MPH | ~ 90 MPH | | Cavitation Range ~ 90 MPH ~ 400 MPH | Average Increase ~ 245 MPH |
| ACCELERATION PROFILE | | ~ 5,800 G's | | | 0 – 52,700 G's | |

\* 600μ particle with ~1200 transverse sulfidic-crosslinks; 60 regenerated vulcanized pre-cursor sites/pass.

FIG. 3A

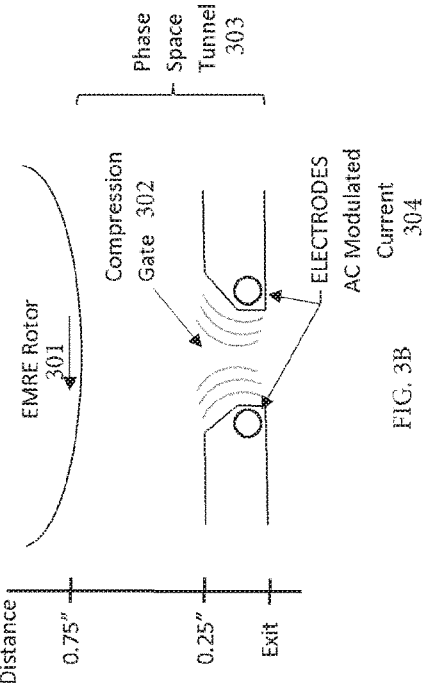

FIG. 3B

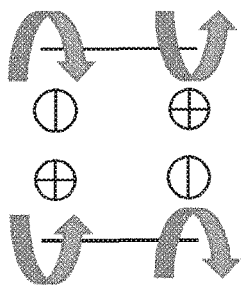

Trampoline effect of rapid compression-stretching-decompression; and/or oscillating AC current, enhances steric effect of repulsion between overlapping electron clouds with subsequent accelerated delamination of GTRP bound matrix.

FIG. 3C

| COMPONENT | METHOD OF CONTROL | ABBREV. | FIRST ORDER RESULT | | DATA GATHERING HARDWARE |
|---|---|---|---|---|---|
| RUBBER-TO-WATER DENSITY | PRE-BATCH RECIRCULATION RESERVOIR MIX | R:W | HIGHER:<br>LOWER: | INCREASE PHASE SPACE TUNNEL PARTICLE COLLISION<br>LOWER REACTOR YIELD; MORE PRECISE END PRODUCT/ENERGY | BATCH MASS:VOL PROGRAMMABLE ELEMENT VISCOSITY DELTA OUPUT |
| CHEMICAL (OMC) SEQUENCE | INTERMITTANT BULK 'DROPS' OR METERED | OMC ADDED | INTER-MITTANT:<br>METERED: | FASTER BATCH TIMES W/ LARGER FINAL PARTICLE SIZE<br>EFFICIENT-TARGETED OMC METATHESIS | METERING PUMP CONTROLLED BY APP |
| SLURRY TEMPERATURE | RECIRCULATION RESERVOIR JACKET TO HEAT &/or COOL | TEMP. | HIGHER:<br>LOWER: | INCREASE OMC COORDINATION COMPLEX FUNCTION; PLUS PENETRATION OF AQUEOUS MEDIUM TO PARTICLE CORE<br>DEFER PHASE SPACE PARTICEL MANIPULATION TO CAVITATION EFFECT & PHOTON BLOCKADE | MULTI-POINT SENSORS TO CORRELATE W/ OTHER SENSOR INPUT FOR INTEGRATED OPTIMIZATION |
| SLURRY PRESSURE ACHIEVED WHERE SLURRY PUMPED THROUGH (PCMR) IN-SERIES | PARALLEL CONTINUOUS FLOW MICRO-SYNTHESIS REACTOR 2ND STAGE SERPENTINE PIPE MODULE WHERE SLURRY TEMPERATURE: PRESSURE MANIPULATE VAPOR/LIQUID PHASE OCILLATIONS | VAPOR LIQUID OCCILATI ON | HIGHER:<br>LOWER: | AUGMENTS PHOTON BLOCKADE PRESERVES ENTROPY LOSS W/ MORE PARTICLE SIZE REDUCTION/UNIT OF INPUT ENERGY<br>DEFERS PHASE SPACE PARTICLE MANIPULATION TO ELECTROMAGNEICS OF DUAL ELECTRODE ELEMENT IN STATOR SLOT | TEMPERATURE & PRESSURE SENSORS PLUS IRIS VALVE CONTROLS TO SET NUMBER OF PRESSURE GRADIENT CHANGES DURING PCMR PASSAGE TIED TO MASTER PROGRAM |
| POST REACTOR PARTICLE DE-WATERING SELECTION | FILTER-PRESS THEN DEHYDRATE OR FULL DEHYDRATION | OMC RESIDUE | HIGHER:<br>LOWER: | REMAINING REACTIVE OMC ASSISTS IN HIGH SHEAR COMPOUNDING INTO MACRO-STRUCTURE BY DRY METATHESIS OF 'ORPHAN' BONDS<br>REDUCES OMC DEMAND IN SUBSEQUENT BATCH; FASTER POST REACTOR PROCESS TIME | MONITOR X LINK DENSITY; TENSILE STRENGTH AND RESILIENCE PROPERTIES OF COMPOUNDED RUBBER MACRO-STRUCTURE THEN CORRELATE FOR EFFICACY |
| PARTICLE SIZE REDUCTION; AND RATE OF REDUCTION | USE ALL OTHER SYSTEM VARIABLES IN BOTH SLURRY CONTROL AND EMRE CONTROLS | RATE OF REDUCTIO N | FASTER:<br>SLOWER: | SHORTER BATCH INTERVALS WITH ENERGY ECONOMIES W/O LOSS OF FINAL PURPOSE OF PROCESS<br>REDUCED POST-PROCESSING OF DRY, REACTOR MODIFIED GTRP | SAME AS V. SAMPLING, DURING BATCH W/ PARTICLE SIZE ANALYZER AND PHYSICAL SMEAR TEST OVER 5μ GRATING TO DETERMINE OUTER DIMENSION AVERAGE AND PARTICLE CORE RESILIENCY |

FIG. 4C.

| COMPONENT | METHOD OF CONTROL | ABBREV. | | FIRST ORDER RESULT | DATA GATHERING HARDWARE |
|---|---|---|---|---|---|
| SPEED ROTOR TIP RPM | VARIABLE FREQUENCY DRIVE | ROTOR TIP SPEED | FASTER: SLOWER: | MORE DISTORTION REDUCED CAVITATION EFFECT | HARD WIRED, PROGRAM FREQ, RPM, AMP, VOLT: TO MOTOR |
| ROTOR TIP-TO-STATOR DISTANCE | MECHANICALLY ESTABLISHED PRIOR TO RUNNING | GAP | LARGER: SMALLER: | INCREASE MIXING INGREDIENT & REACTION TIME MAINTAIN PARTICLE VELOCITY & MAXIMIZE CAVITATION EFFECT | CHART RESULT FOR DIFFERENT GAPS VS FINISHED PRODUCT AS DATA ENTRY POINT - PRGM |
| STATOR GAP APERATURE SHAPE & AREA | ADJUSTABLE, CONCENTRIC DUAL SHELL PLATES SET-UP BEFORE RUNNING OR ADJUSTABLE ON-THE-FLY | APERATURE | GREATER: LESSER: | ACCOMMODATE SMOOTH FLOW OF LARGE PARTICLE AT START OF REACTOR RUN IMPROVE CAVITATION EFFECT OF SMALLER PARTICLE LATE IN RUN | PRE-BATCH FUNCTION TO BE DETERMINED AND ENTERED AS A PROGRAMMABLE ELEMENT/APP |
| RECIRCULATION RESEVOIR VOLUME | PRE-SET VOLUME FOR SINGLE OR MULTI-STAGE PROCESS TARGET(S) | VOLUME | LARGER: SMALLER: | IMPROVED DIELECTRIC RELAXATION; UNIFORM GROUND STATE HIGHER PHASE SPACE TUNNEL ENERGY RETENTION | PRE-BATCH FUNCTION; CALCULATE AS PROGRAM ELEMENT APP |
| STATOR APERATURE PASSAGE WAY EMBEDDED, OVAL ELECTRODE GATE WIRED TO HIGH VOLTAGE AC SOURCE | POWER CONTROL MODULE WITH VARIABLE: FREQUENCY, VOLTAGE, AMPERAGE CONTROLS (V) (A) (f) = 3 VARIABLES | (V) (A) (f) | VARIABLE INCREASE VARIABLE DECREASE | RAPID PHOTON BLOCKADE INFILL & CAPACITY TO TRIGGER PHASE CHANGE(S) ENHANCE PARTICLE CORE ELECTRON CLOUD REPLUSION; INNER DELAMINATION | VOLT AMP FREQUENCY METERS; TO BE INTEGRATED INTO PROGRAMMABLE APP |

FIG. 4D

ELEMENT FIVE. Chemotactic sulfidic-bridge-tether-effect (SBTE)

FIG. 5A

⊡ Pendant vulcanizate precursor @ predominant methyl carbocation (originally forms @ ~140°C)

▲ Completed vulcanization @ allylic carbocation (subsequently forms @ ~160°C)

CARBOCATION STABILITY

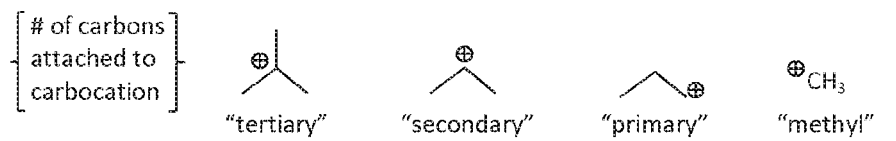

$\begin{bmatrix} \text{\# of carbons} \\ \text{attached to} \\ \text{carbocation} \end{bmatrix}$    "tertiary"    "secondary"    "primary"    "methyl"

Most Stable ⎯⎯⎯⎯⎯⎯⎯⎯⎯→ Least Stable

FIG. 5B

ELEMENT SIX: Chemical Reaction Products and Timeline

PROCESS FOR REGENERATING A MONOLITHIC, MACRO-STRUCTURAL, INTER-PENETRATING ELASTOMER NETWORK MORPHOLOGY FROM GROUND TIRE RUBBER PARTICLES

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. application Ser. No. 16/803,335, filed Feb. 27, 2020, which is a divisional of U.S. application Ser. No. 16/497,775, filed Sep. 25, 2019, now U.S. Pat. No. 10,662,320, which is the national stage in the United States of PCT International Application No. PCT/US2018/028656, filed Apr. 20, 2018, which claims the benefit of U.S. Provisional Application No. 62/489,878, filed Apr. 25, 2017, U.S. Provisional Application No. 62/541,610, filed Aug. 4, 2017, U.S. Provisional Application No. 62/569,374, filed Oct. 6, 2017, U.S. Provisional Application No. 62/613,744, filed Jan. 4, 2018, and U.S. Provisional Application No. 62/621,465, filed Jan. 24, 2018. Each of the aforementioned applications is incorporated by reference herein in its entirety, and each is hereby expressly made a part of this specification.

FIELD OF THE INVENTION

Crumb rubber obtained from recycled tires is subjected to a process involving phase reticulation induced sulfidic metathesis. The process utilizes a reactive component that interferes with sulfur bonds. The resulting rubber, subjected to interlinked substitution, exhibits properties similar to those of the virgin composite rubber structure prior to being granulated, or other polymeric materials, and is suitable for use in fabricating new tires, engineered rubber articles, and asphalt rubber for use in waterproofing and paving applications.

BACKGROUND OF THE INVENTION

In 2015, end-use markets consumed 87.9% percent by weight of the scrap tires generated in the U.S. The total volume of scrap tires consumed in end use markets in the U.S. reached approximately 3551 thousand tons of tires. RMA estimates that about 4038 thousand tons of tires were generated in the U.S. in 2015. Of those tires, 25.8% were used to produce ground rubber, 48.6% for tire derived fuel, 11.4% were land disposed, 7.0% were used in civil engineering, and 7.1% went to miscellaneous uses (0.7% to electric arc furnace, 1.3% to reclamation projects, 2.6% were exported, and 2.6% went to other uses). In 1990, only eleven percent of tires were consumed on a per tire basis. Positive end-use market results in 2015 were primarily the result of high rates of TDF use and lower exports. In the long term, the need to expand all economically viable and environmentally sound markets for scrap tires is still an imperative. Scrap tires were consumed by a variety of scrap tire markets, including tire-derived fuel, civil engineering and ground rubber applications. Other smaller markets and legal landfilling consumed the remaining annually-generated tires.

Key scrap tire markets include tire derived fuel, ground rubber, civil engineering and other markets. In tire derived fuel applications, scrap tires are used as a cleaner and more economical alternative to coal as fuel in cement kilns, pulp and paper mills and industrial and utility boilers. Ground rubber applications utilize approximately 1020 thousand tons of scrap tires, or over 25 percent of the volume of scrap tires generated each year. Ground rubber is produced by grinding scrap tires into size defined pieces. Ground rubber applications include new rubber products, playground and other sports surfacing and rubber-modified asphalt. Ground rubber also includes larger pieces of rubber used as landscaping mulch, and loose fill playground material. The playground and mulch market was the most dynamic segment in the ground rubber market during this period. The asphalt market uses ground rubber to modify the asphalt binder used in road paving, resulting in quieter, more durable roads. The civil engineering market consumes approximately 274 thousand tons of tires per year, about 7.7 percent of the total tires to market, and consists of tire shreds used in road and landfill construction, septic tank leach fields, alternative daily cover and other construction applications. Additional smaller markets for scrap tires exist that consume approximately 7% of annually generated scrap tires. These markets include tires consumed in electric arc furnaces (steel manufacturing), professionally engineered tire bales and products punched, pressed or stamped from scrap tires. Total tire rubber consumed in ground rubber markets is about 1.36 billion pounds. The total scrap tires diverted to these ground rubber markets is about 1.02 million tons (62 million tires). The percent of total pounds of ground rubber consumed in the market in 2015 is as follows: sport surfaces 25%, playground mulch 22%, molded/extruded products 35%, asphalt 15%, automotive uses 2%, and export 1%.

Stockpiles of scrap tires historically began to be created around the 1960s and 1970s when tires were diverted from landfills, but recycling markets for them were not functional. Stockpiles proved to be prone to catastrophic fires which created air and water pollution.

Worldwide rubber tire production is responsible for generating approximately 99% of worldwide, end-of-life (EOL) tire scrap. About 1.1 billion scrap tires are generated annually, corresponding to roughly 12 million tons of scrap tire. Due to the punishing physical properties required of a new tire, tires embody a carefully engineered weaving together of steel and fiber cords with a mineral and carbon-filled rubber blend, all cross linked to a highly tenacious structure. The EOL tire is challenging to breakdown to its original essential elements. The potentially highest value component—the rubber—is particularly difficult to reclaim, due to the vulcanization process it is subjected to. As a result EOL tires that are no longer suitable for use on vehicles due to wear or irreparable damage are typically either subject to pyrolysis (e.g., to generate energy for use in cement manufacturing), or ground up to be used as filler (e.g., in asphalt pavement, new tires, construction or landscaping materials).

SUMMARY OF THE INVENTION

While extensive research efforts have been devoted to development of methods for devulcanizing vulcanized rubber, e.g., tire rubber, a method for recovery or transformation of tire rubber into a commercially viable product having properties similar to virgin composite rubber has heretofore not been developed.

An interlinked substitution method for extracting, utilizing, or transforming the natural or synthetic rubber in waste tires and other vulcanized rubber scrap offers potential as a low cost source for quality natural or synthetic rubber. Such reclaimed materials may exhibit properties similar to, or even superior to, those of the product from which they are derived. Rubber subjected to processes as described herein is variously referred to herein as "treated rubber", "activated rubber", "interlinked substituted rubber", "PTR rubber", "post reactor ground tire rubber", "EOL tire rubber crumb-derived rubber" or the like.

One of the objects of the methods described herein is to process vulcanized rubber products or other cross linked rubber containing products, e.g., as found in end-of-life (EOL) rubber tires, into a form suitable for use as a raw material in the fabrication of articles of manufacture that would conventionally be fabricated from virgin rubber subjected to vulcanization, e.g., new tires or other vulcanized rubber products. The vulcanized rubber subjected to the methods described herein is typically provided as a conventionally available, 30 mesh, end-of-life, ground tire rubber particle (GTRP). It is subjected to a method whereby it is transformed into a crosslink re-aligned, 5-10 micron moiety, wherein the micro-moiety may be re-fabricated into a monolithic, macro-structure characterized by an interpenetrating elastomer network exhibiting physical properties substantially analogous to the macro-structural properties of the original, EOL tire rubber prior to being size-reduced to the 30 mesh particle.

Two inter-dependent, parallel and nearly simultaneous, interacting, process systems are successfully executed to achieve one or more of the various objectives of the methods described herein. To ensure a desired end result, process management can optionally be data driven, in real time and/or by post-process analysis of the integration of the micron moiety into finished product, macro-structure(s).

In the first system, an aqueous, chemical solution is provided into which the particle is immersed. The aqueous, chemical solution acts to dissociate the transverse sulfuric bridge from a pendant elastomer bond in a manner that pre-nucleates the pendent site for a subsequent, re-alignment and crosslink. This dissociation substantially preserves the sulfidic bridge as an intact and bound 'tether' upon the companion, parallel non-pendant backbone to which it was originally fixed (e.g., vulcanized).

In the second system, an electromagnetic-mechanical system is employed which stress-distorts the particle to a sub-hysteresis, strain threshold. This maximizes the exposure of the elastomer crosslink sites to the aqueous, chemical solution such that the chemical of the aqueous, chemical solution can operate at pico-second speed to perform the dissociative substitution described in the first system.

The fully vulcanized GTRP exhibits substantial resilience to distortion along all three axes. This resilience is observed whether the external force is a compressive mechanical force, a tensile mechanical force, a torsional mechanical force, or a force that is electromagnetic in nature. This resilience is manifest in a rapid recovery to the dimensional and dielectric ground state(s) of the rubber. The resilience strain is the interactive product of the two, interdependent process systems described above being quicker than the distortion-relaxation cycle, inclusive of being properly coordinated.

The Joint Research Council (JRC) for the EC recently published a Critical Raw Material (CRM) study in December 2017 listing 27 materials subject to supply disruption; a disruption that would result in significant loss of economic sustainability. Natural rubber (NR) was listed as one of the 27 materials. The process disclosed herein can provide up to 70% of the natural rubber gap referred to in the CRM study.

In a first aspect, a method is provided for preparing a modified rubber, comprising: introducing an aqueous slurry comprising vulcanized rubber particles and an organometallic compound into an electromechanical reactor configured to generate a phase space environment with cavitation, so as to induce delamination of a rubber matrix within the vulcanized rubber particles as coordinated with disrupting sulfidic linkages.

In an embodiment of the first aspect, the method further comprises reestablishing sulfidic linkages to establish within the matrix sulfur bridge cross linked, re-aligned, laminates.

In an embodiment of the first aspect, delamination is associated with a portion of rigid sulfidic bridges of the vulcanized rubber particles becoming unbound at an original methyl carbocation while remaining tethered at an original allylic carbocation.

In an embodiment of the first aspect, the organometallic compound comprises a metal having octahedral molecular geometry.

In an embodiment of the first aspect, the organometallic compound comprises a metal ion selected from the group consisting of $Co^{2+}$, $Cu^{2+}$, $Ni^{2+}$, $Zn^{2+}$, and $Mn^{2+}$.

In an embodiment of the first aspect, the organometallic compound comprises an organic anion as a ligand to the metal ion.

In an embodiment of the first aspect, the organic anion comprises acetate ion.

In an embodiment of the first aspect, the organometallic compound is copper acetate.

In an embodiment of the first aspect, the organometallic compound is a metal salt that undergoes a phase change from solid to liquid or vapor in a range of 100-150° C.

In an embodiment of the first aspect, a temperature in the electromechanical reactor is maintained at ambient by use of a cooling jacket or cooling coils.

In an embodiment of the first aspect, the vulcanized rubber crumbs have a particle size greater than 200 mesh.

In a second aspect, an electromechanical reactor is provided comprising: a rotor having a plurality of slots; and a stator, wherein the electromechanical reactor is configured to create a phase space environment by generating a mixture of entrained air, an organometallic compound, and ground tire rubber particles in a liquid subject to cavitation.

In a third aspect, a rubber-based heterogeneous matrix is provided comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

In an embodiment of the third aspect, carbon black particles are dispersed amongst the laminates.

In an embodiment of the third aspect, the two or more elastomers comprise virgin natural rubber and an elastomer derived from ground tire rubber.

In an embodiment of the third aspect, the two or more elastomers comprise virgin styrene butadiene/butadiene rubber and an elastomer derived from ground tire rubber.

In an embodiment of the third aspect, two of the two or more elastomers have different backbone chemistries.

In an embodiment of the third aspect, the two of the two or more elastomers having the different backbone chemistries are woven together and then cross linked separate from one another.

In a fourth aspect, a sheet of the rubber-based heterogeneous matrix of the third aspect or any of its embodiments is provided.

In an embodiment of the fourth aspect, the sheet exhibits an anisotropy in length tensile strength to width tensile strength, wherein the anisotropy in length tensile strength to width tensile strength is from 1.1:1 to 3:1.

In a fifth aspect, a laminate comprising a plurality of the sheets of the fourth embodiment is provided.

In an embodiment of the fifth aspect, each of the sheets has a thickness in a range of 10 to 70 microns.

In an embodiment of the fifth aspect, each of the sheets is vacuum-heat fused and cross linked to an adjacent sheet.

In an embodiment of the fifth aspect, each of the sheets is oriented 30 to 45 degrees to an anisotropic grain of an adjacent sheet.

In a sixth aspect, a ground tire rubber composite structure is provided having an unbound, reptated internal morphology, wherein a portion of the rigid sulfidic linkages therein are each tethered at an original allylic carbocation and unbound at an original methyl carbocation.

In a seventh aspect, a vulcanized rubber is provided, wherein a portion of the rigid sulfidic linkages therein are each tethered at an original allylic carbocation and unbound at an original methyl carbocation, and wherein a portion of polymer backbones within the vulcanized rubber are substituted by an acetate moiety.

In an eighth aspect, a rubber tire is provided, wherein from 3% by weight to 15% by weight of the rubber in the tire is prepared by a method substantially as described herein.

In a ninth aspect, a rubber tire is provided, wherein from 15% by weight to 100% by weight of the rubber in the tire is prepared by a method substantially as described herein.

In a tenth aspect, a tire tread is provided, comprising from 10% by weight to 50% by weight of an interlinked substituted rubber substantially as described herein.

In an eleventh aspect, a tire sidewall is provided, comprising from 10% by weight to 100% by weight of an interlinked substituted rubber substantially as described herein.

In a twelfth aspect, an asphalt-rubber binder is provided, comprising from 5% by weight to 95% by weight of an interlinked substituted rubber substantially as described herein.

In a thirteenth aspect, an asphalt emulsion is provided, comprising from 5% by weight to 95% by weight of an interlinked substituted rubber substantially as described herein.

In a fourteenth aspect, an asphalt roofing material is provided, comprising from 5% by weight to 95% by weight of an interlinked substituted rubber substantially as described herein.

In a fifteenth aspect, an interlinked substituted rubber substantially as described herein is provided.

In a sixteenth aspect, a tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, or molding comprising an interlinked substituted rubber product as described herein is provided.

Any of the features of an embodiment of the first through sixteenth aspects is applicable to all aspects and embodiments identified herein. Moreover, any of the features of an embodiment of the first through sixteenth aspects is independently combinable, partly or wholly with other embodiments described herein in any way, e.g., one, two, or three or more embodiments may be combinable in whole or in part. Further, any of the features of an embodiment of the first through sixteenth aspects may be made optional to other aspects or embodiments. Any aspect or embodiment of a method can be performed by a system or apparatus of another aspect or embodiment, and any aspect or embodiment of a system or apparatus can be configured to perform a method of another aspect or embodiment.

DESCRIPTION OF THE DRAWINGS

FIG. 3A depicts the process of the GTRP traversing a "phase space tunnel" wherein differential-cyclical, mechanical stress and steric field polarization are applied.

FIG. 3B illustrates the phase space tunnel 303 between the EMRE rotor 301 and the compression gate 302.

FIG. 3C illustrates the effect of rapid compression-stretching-decompression of the GTRP.

FIG. 4C provides a table listing GTRP slurry control variables.

FIG. 4D provides a table listing EMRE process control variables.

FIG. 5A schematically depicts the chemotactic sulfidic bridge tether effect.

FIG. 5B provides an illustration of carbocation stability.

DETAILED DESCRIPTION OF THE EMBODIMENTS

Figure 1:
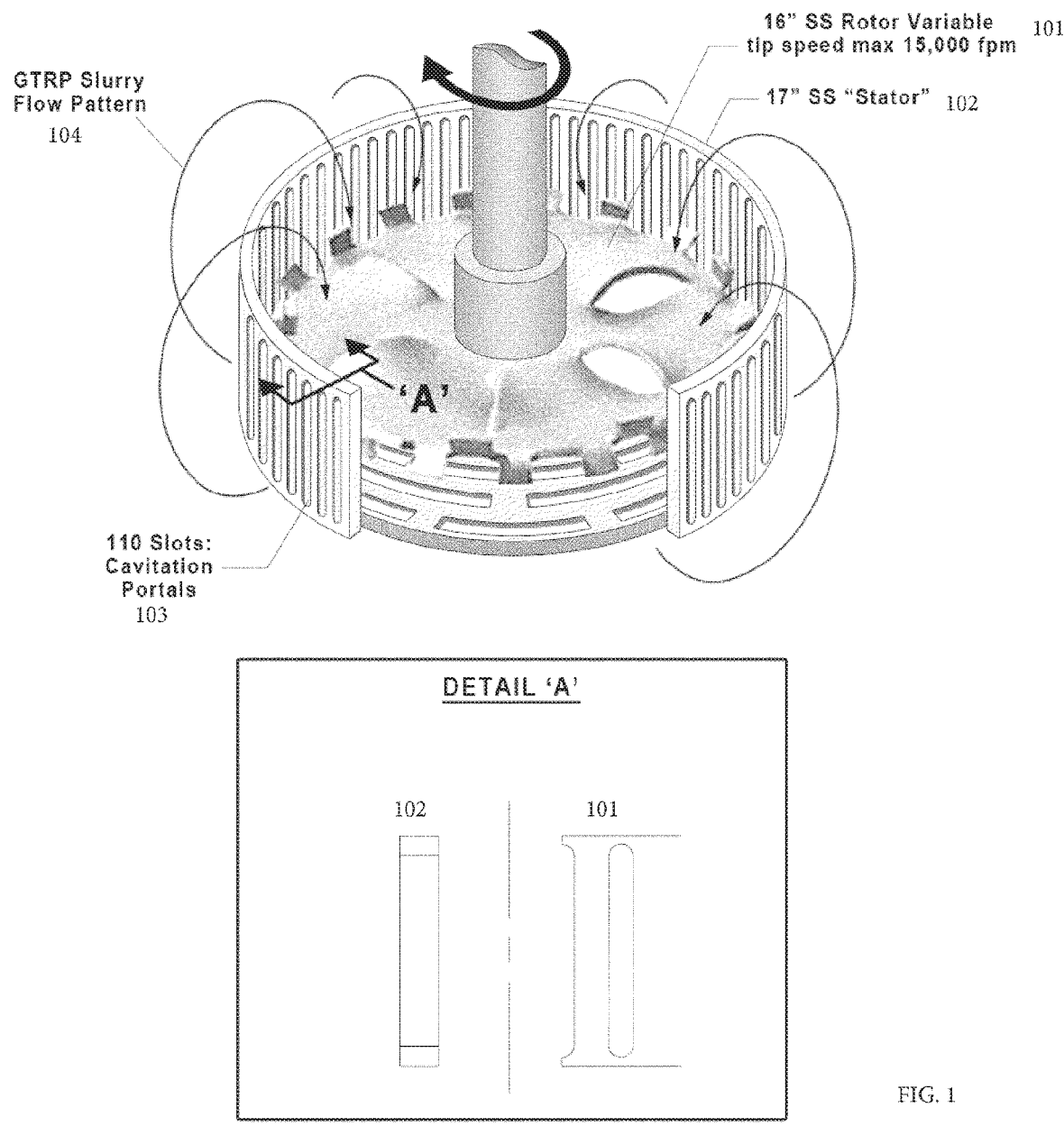
FIG. 1 depicts an electromechanical reactor environment (EMRE) including rotor 101, stator 102, and slots/cavitation portals 103 cooperating to generate a ground tire rubber particle (GTRP) slurry flow pattern 104.

The following description and examples illustrate an embodiment of the present invention in detail. Those of skill in the art will recognize that there are numerous variations and modifications of this invention that are encompassed by its scope. Accordingly, the description of an embodiment should not be deemed to limit the scope of the present invention.

INTRODUCTION

An ambient, end of life (EOL), ground tire rubber (GTR) particle in the size range of approx. 600 microns (30 mesh), has a cross section composed of either the old tire tread or the tire side wall or a combination of the two. It may be generally characterized as a heterogeneous matrix of an interpenetrating, cross linked, elastomer network filled with inorganic substances, primarily carbon. Depending upon whether it is primarily tire tread or sidewall in origin the primary entangled elastomers will be natural rubber (NR) or styrene butadiene/butadiene rubber (BR S-BR), with the BR and S-BR typically having the larger mass component in the tread for better wear and the sidewall having an NR bias for improved flexural qualities. The crosslink may generally be described as elemental sulfur and/or a complex compound incorporating sulfur as its principal element, e.g., a polysulfidic chemical.

During tire construction the interpenetrating elastomer networks are formed using a sequential crosslink of the predominant elastomer (NR or S-BR) followed by the crosslink of the secondary elastomer, such that the secondary elastomer is "bent" to conform to the already vulcanized, higher strength primary elastomer. This technique imparts mechanical characteristics that are retained in the individual GTR particle.

A single vehicle tire, after being stripped of steel and fiber reinforcement will yield approximately sixteen pounds (16 lbs) of reusable GTR, with truck tires yielding more. Over one billion EOL tires are generated worldwide annually. About 50% are consumed as low value fuel. Where possible, maximizing the reuse of this raw material for its proven mechanical properties represents a substantial challenge, but, to the extent achieved, a resource recovery value of as much as 200:1 is observed when comparing its possible re-use in new tire construction to being consumed in a furnace for its BTU content.

Notably, recent detailed studies of the environmental advantages such a reversal of EOL-GTR usage, maximized, predicts that atmospheric carbon contribution might be reduced by the equivalent of shutting down 14 coal fired power plants (300,000 rail cars of coal) or removing six million vehicles from the roads or planting an additional 62 million acres of forests (equivalent to an area the size of the state of Arizona) for carbon sequestration. Accordingly, one object of the methods and compositions discussed herein is to prepare the GTR particle so that it may be recombined with similar particles or materials into a monolithic unit which may be integrated into the full spectrum of industrial rubber goods manufactured worldwide.

A method is provided that allows one to achieve the objective of preparing, augmenting, and then recombining the GTR particle(s) in such a manner that the individual, complex, heterogeneous, cross linked moieties are built into a re-entangled, monolithic structure, substantially composed of the original GTR; with uniform mechanical properties which are at least equivalent to the whole tire properties of the rubber matrix prior to the granulation process. Achievement of this objective is demonstrated by the end product being competitively re-introduced as feedstock for new tire and industrial rubber production.

The macro-characteristics of a ground tire rubber particle may be viewed from the perspective that it is a bit like an egg that has been scrambled, and therefore it cannot ever be un-scrambled. Similarly, it can be viewed as like an old car that has been crushed at a recycling yard, such that it can never be un-bent to its original specification. To some degree both these metaphors have merit. However, upon a closer examination a list of unusual mechanical qualities and conditions becomes apparent, which, if exploited, provide an opportunity to recover this complex resource in a commercially and technically viable way; whereby complete resource recovery emerges.

In GTR, the qualities and conditions of opportunity include the following. A substantial inventory exists of un-bound, eight sided sulfur rings. Previous accelerator chemistry byproducts have been degraded such that they may be mitigated so as not to interfere with further cross-linking processes. Existing crosslink density and sulfur bond length can be accurately assessed by chemical probe. A substantial, recoverable, ineffective elasticity exists within the interpenetrating density due to loop crosslinks within a single molecular backbone. The original, new tire morphology has undergone rigorous physical challenges causing the remaining structure to be annealed. A very high particle surface shoreline is presented as a result of the ambient grinding process. Substantial un-used allylic hydrogen and carbon sites remain in the entangled polymer structure(s). Classic, transverse sulfur bridge formation is well verified, providing a focused mechanistic model to approach resource recovery.

The strategic effort, using these qualities and conditions, is to 1) gently unpack the dense GTR composite structure, 2) dislocate the least stable attachment point of the transverse crosslink without negatively altering the elastomer molecule or the sulfur bridge, 3) install a complimentary virgin polymer receptor upon a dislocation site, then 4) following subparticle mechanically induced leafing, re-crosslink the original hinged, sulfur bridge at susceptible, dislocation sites along the elastomer backbone.

Unassisted, elemental sulfur will slowly crosslink functional rubber polymers, but the process is too slow and has too many end property difficulties to be a commercially realistic alternative to a commercially successful vulcanization. Vulcanization as discussed herein regards an accelerated sulfur vulcanization process as is practiced in commercial vulcanization.

Sulfur vulcanization was discovered by Charles Goodyear in 1839. After 178 years of development, it is universally agreed that the processes are complex which result in the formation of the transverse sulfuric bridge between adjacent, interpenetrating rubber polymers. These bridges in turn yield mechanical properties in an elastomeric material which are critical to civilization. However, much progress has been made and many, definitive elements of the progression are well established.

While a free-radical mechanism had long been assumed to be the controlling phenomena, more recently, with the advent of more advanced methods of discreet process characterization, a convincing presence has not been detected of the primary, theoretical radicals necessary to validate that mechanism. In contrast, an ionic mechanism has been predicted and validated using similar advanced process characterization methods. Since the modern vulcanization process involves many chemical components being mixed together at the start of the process, each (combination) with its own chemical reaction pathway, it is likely that both radical and ionic mechanisms are active but analysis reveals that the ionic mechanism is predominant.

A typical example (by wt. %) of an NR-BR tire compound is: NR 80%, BR 20%, ZnO 5%, steric acid 2%, silica-talc 3%, carbon black 55%, aromatic oil 10%, elemental sulfur 1.7%, N-Cyclohexyl-2-benzothiazole sulfenamide (CBS—an accelerator) 1.2%, 2-(4-Morpholinothio)-benzothiazole (MBS—an accelerator) 1.1%, and N-tert-butyl-2-benzothiazole sulfenamide (TBBS—an accelerator) 1.1%.

The process begins in a heated mold, after the tire recipe components have been thoroughly distributed and dispersed. The vulcanization process may be seen in three sequential events: 1) formation of the accelerator complex chemistry, 2) formation of the crosslink precursor, and 3) completion of the crosslink.

Formation of the Accelerator

Using, by way of example, the popular 2-mercaptobenzothiazole (MBT) accelerator model, a consensus exists that a sulfonamide accelerator in the presence of sulfur decomposes under heating into MBT and a respective amine. Progressively the MBT then reacts with the remaining sulfenamide molecules to auto catalytically form 2,2'-dithiobenzothiazole (MBTS) thereby releasing the amine molecules. MBTS then reacts with elemental sulfur forming polysulfide an active sulfurating agent (persulfonium ion source). A possible reaction mechanism for precursor formation follows.

Formation of the Crosslink Precursor

This second stage reaction, feeding off of the newly formed accelerator intermediate, which is bound to both ends of the forming sulfur chain, begins when the sulfurating agent reacts with a pendant structure attached to an isoprene or butadiene elastomeric molecule chain yielding the formation of a persulfonium ion (I). The resultant persulfonium ion then reacts with a second isoprene or butadiene molecule by allylic hydrogen scavenging to produce a polymeric methyl carbocation. The formed intermediate, also referred to as a polythio-mercapbenzothiazyl group introduces monomeric sulfur into a bonding position in the pendant group which is converted by a new carbocation into a double bond by anionic addition. This formation of the final double bond ultimately occurs with sulfenamide decomposition to uncharacterized isomers near the reaction site.

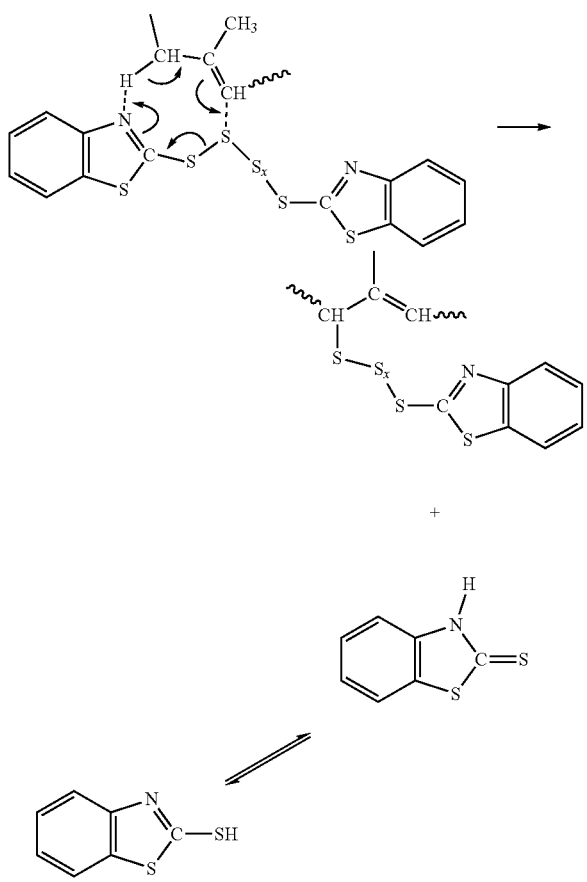

Formation of the Crosslink

In the final step the backbone of the adjacent rubber polymer chain is attacked at an allylic carbon position which is susceptible to carbocation by the polysulfide group bound onto the remaining 'end' of the elemental sulfur chain. The sulfur chain, in a final cross linked form, may be up to twenty (20) atoms in length but typically does not exceed (7) atoms. The sulfur bridge may contain individual atoms but usually contains one or several elemental, eight sided sulfur rings ($S_8$). Longer chains may shorten when the cure time and temperature are extended beyond the completion of the crosslink; or during the associated annealing process. It is important to note that no sulfidic chain can form until the otherwise dissociated, sulfur compound 'maw' becomes attached at the precursor site. Only the last step of the crosslink formation is detected in a moving die rheometry (MDR) curve.

Characterizing the Final Crosslink

Crosslink density and type are determined by chemical swelling method and chemical probes, respectively; or by spectroscopy.

Elastically effective network chain crosslink density may be calculated by the Flory-Rehner Equation once data is empirically ascertained. Subsequently, the same localized sample used to determine crosslink density is subjected to a piperidine-propane-2-thiol chemical probe (PPTCP) which will determine the sulfidic crosslink (S>3) proportion. Further treated the same PPTCP sample may reveal the di-sulfidic and mono-sulfidic proportions using a piperidine-hexane-1-thiol chemical probe. Thereupon by percentage of the original crosslink density the percentages of each may be computed and beneficially compared to the MDR curve.

C MAS NMR spectra is cross validated by chemical probe method(s) with polysulfide and mono sulfide resonance peaks at 57.5 and 50.4 ppm respectively (B2 type structures by way of example); and resonant peaks of 37.3, 44.7, 48.2, 49.6, 50.6, 52.5, 54.8 and 57.5 ppm using one-half the sum of these areas to yield cross link density.

Estimation of Looping Probabilities

When a crosslink occurs between neighboring polymer chains it provides elasticity and shear modulus to the rubber composite. However whenever the crosslink forms within the same polymer chain it forms a loop and it is elastically ineffective and may be characterized as a flaw or weak spot in the structure of the vulcanized rubber matrix. Detailed analysis of the looping probability reveals that the occurrence of this unwanted condition occurs within a range of 5-15% of the total number of crosslinks in a given commercially vulcanized rubber. Dependent upon the location of the unwanted crosslink the looped polymer molecular chain can relegate from 5% to 20% of the rubber polymer to an ineffective cyclic hydrocarbon. It is noted that the repeated elastomer morphology of a GTRP processed by the methods of the embodiments has reduced susceptibility to this phenomena.

Conventional Usage of Scrap Rubber in Tire

Excluding the rubber trimmings generated prior to the final heating and cross linking of new tires, it is estimated that less than 0.0004% by weight of all EOL tires are reincorporated into a new tire master batch. Such reincorporation has been successfully accomplished at master batch loadings of up to 3% by weight utilizing very fine, cryogenically processed ground rubber obtained from EOL tires. A loading of EOL tire-derived processed ground rubber greater than this has thus far not been feasible, in that the physical properties required of new tire applications are not met at higher loading levels. Tire production typically begins with a base formula of components, with the base formula developed by selection of raw material(s). This is then reduced to a master batch in high shear mixing equipment. Typically, the master batch is done in two phases: the master pass and the finish pass. The master pass combines various rubber species which are introduced as small bales or sheets and are blended with fine powders of carbon black and minerals, as well as a small quantity of process oil(s). This step is performed at the high temperature required to lower the viscosity of the rubber elements such that the flow-resistant powder elements can be uniformly distributed in sufficiently small clusters or packets. These clusters or packets can then be subsequently dispersed to a minimal particle size. The finish pass is done at a lower temperature and usually under process conditions that create more of a smearing action of the heterogeneous elements. In the finish pass, rubber polymers are not further degraded by high temperatures as in the master pass, and the uniformly distributed agglomerates of powder components are worked into such small physical size that they become dispersed within the free molecular space of the rubber elements. Once the finish pass is completed, the master batch bales are ejected from the mixer and rolled into thin sheets (referred to as milling). The milled sheets are used to lay up, on specialized forming equipment, the tire carcass prior to being placed in a compression molding press for final crosslinking by thermal and/or chemical means.

Crosslinking accelerants include mercapto group or sulfur-based (e.g., elemental sulfur and/or, accelerator derivatives of N-tert-butyl-2-benzothizolesulfenamide (TBBS)). The sulfur-based crosslinking agents which react with sites in the master batch at or above a prescribed temperature may be partially introduced at both the master pass and the finish pass phase. The crosslinking during the final heating of the tire carcass causes the reactive sites in the various rubber elements to build a sufficient crosslink density to achieve the final physical properties required to meet the sustained load and heat environment to which the tire will be subjected.

A method for targeting the crosslink precursor site has been developed which enables interlinked substitution of EOL tire, such that a functionally re-aligned, re-cross linkable, submicron particle rubber can be obtained. This rubber is suitable for reintroduction into new tire production at levels of up to 100% by weight of subsequent new tire master batch production. The new tires, utilizing such EOL tire-modified feedstock, exhibit performance qualities equivalent or similar to those achieved when all virgin materials are utilized.

Rubber from End-of-Life Tire Scrap

Rubber-containing crumb is manufactured from two primary feedstocks: tire buffings, a byproduct of tire retreading, whole tire, and scrap tire rubber. Scrap tire rubber comes from three types of tires: passenger car tires; truck tires; and off-the-road tires. End product yields for each of these tire types are affected by the tire's construction, strength and weight. On average, 10 to 16 pounds of end-of-life tire crumb can be derived from one passenger tire. Other sources of rubber-containing crumb includes products containing or made using recycled rubber-containing crumb, e.g., new rubber products, playground surfacing, rubber mulch, drainage aggregate, construction fill material, scraps from manufacturing, and the like.

Tires are composite structures containing a number of components. The tire carcass is composed of the tread, bead, sidewall, shoulder, and ply. Tires are formed from components such as natural and/or synthetic rubber, cords, and filler. The polymer most commonly employed for the tread and encasement of the cords is a blend of NR and S-BR copolymer. Cords form the ply and bead of the tire, and provide tensile strength necessary to contain the inflation pressure. Cords can comprise steel, natural fibers such as cotton or silk, and synthetic fibers such as nylon or Kevlar. Fillers can include silica and carbon black. A representative tire can comprise one or more of: synthetic rubber, natural rubber, sulfur and sulfur-containing compounds, silica, phenolic resin, oil (aromatic, naphthenic, and/or paraffinic), fabric (polyester, nylon, etc.), petroleum waxes, pigments (zinc oxide, titanium dioxide, etc.), carbon black, fatty acids, miscellaneous inert materials, and steel wire.

The typical passenger tire comprises 14% natural rubber, 27% synthetic rubber, 28% carbon black, 14-15% steel, and 16-17% fabric, fillers, accelerators, antiozonants, and other miscellaneous components. The average weight of a new passenger car tire is 25 lbs., and for a scrap passenger tire 22 lbs. Truck tires typically contain 27% natural rubber, 14% synthetic rubber, 28% carbon black, 14-15% steel, and 16-17% fabric, fillers, accelerators, antiozonants, and other miscellaneous components. The average weight of a new truck tire is 120 lbs., and for a scrap truck tire 110 lbs. Other types of tires can contain higher amounts of synthetic and/or natural rubber, e.g., 70% (by weight) rubber, 15% steel, 3% fiber, and 12% of other materials such as inert fillers. Rubber is found in tire components including tread, innerliner, beads, belts, and the like. The percent rubber by weight in a new passenger tire is typically as follows: 32.6% in tread; 1.7% in base, 21.9% in sidewall, 5.0% in bead apex, 1.2% in bead insulation, 11.8% in fabric insulation; 9.5% in insulation of steel cord, 12.4% in innerliner, and 3.9% in undercushion.

The rubber compounds employed in a typical tire, along with associated materials, are set forth in Table 1. The methods described herein are suitable for processing tire tread, base, sidewall, as well as innerliner, and are also suitable for processing other materials containing vulcanized (or otherwise cross linked) natural rubber, styrene-butadiene rubber, and isobutylene-isoprene rubber. As further described herein, the other components, e.g., carbon black, present in EOL tire or other vulcanized-rubber containing articles of manufacture may in some embodiments remain in the rubber subjected to the processes described herein, with no processing conducted to impact the properties or amounts of the other component(s). In other embodiments, the rubber may be subjected to further processes to enrich or minimize these additional components, or change their properties.

TABLE 1

|  | Tread (PHR) | Base (PHR) | Sidewall (PHR) | Innerliner (PHR) |
| --- | --- | --- | --- | --- |
| Natural Rubber | 50.0 | 100.0 | 75.0 |  |
| Styrene-Butadiene Rubber | 50.0 |  | 25.0 |  |
| Isobutylene-Isoprene Rubber |  |  |  | 100.0 |
| Carbon Black (Grade N110) | 50.0 | 15.0 | 20.0 |  |
| Carbon Black (Grade N330) |  | 25.0 | 35.0 |  |
| Carbon Black (Grade N765) |  |  |  | 50.0 |
| Processing Oil | 7.5 | 5.0 | 5.0 | 3.0 |
| Antioxidant | 1.0 | 0.75 | 1.0 | 1.0 |
| Antioxidant Wax |  |  | 2.0 |  |
| Stearic Acid | 2.0 | 4.0 | 3.0 | 1.5 |
| Zinc Oxidant | 5.0 | 5.0 | 5.0 | 5.0 |

TABLE 1-continued

|  | Tread (PHR) | Base (PHR) | Sidewall (PHR) | Innerliner (PHR) |
| --- | --- | --- | --- | --- |
| Accelerator (High) |  | 1.0 | 0.7 |  |
| Accelerator (Middle) | 1.25 |  |  | 0.4 |
| Accelerator (Low) |  |  |  | 0.4 |
| Sulfur | 2.5 | 3.0 | 2.8 | 2.0 |

*PHR = Per Hundred Rubber, parts on a weight basis
*Carbon grade = ASTM grading: Particle size and structure of carbon are different.

There are approximately 2.5 pounds of steel belts and bead wire in a passenger car tire. This material is made from high carbon steel with a nominal tensile strength of 2750 MN/m$^2$. The steel tire cord composition of a typical tire is set forth in Table 2.

TABLE 2

|  | Steel Belts | Bead Wire |
| --- | --- | --- |
| Carbon | 0.67-0.73% | 0.60% min. |
| Manganese | 0.40-0.70% | 0.40-0.70% |
| Silicon | 0.15-0.03% | 0.15-0.30% |
| Phosphorus | 0.03% max. | 0.04% max. |
| Sulfur | 0.03% max. | 0.04% max. |
| Copper | Trace | Trace |
| Chromium | Trace | Trace |
| Nickel | Trace | Trace |
| Coating | 66% Copper 34% Zinc | 98% Brass 2% Tin |

Whole tires can be ground to yield rubber particles mixed with other components of the tire. Methods for producing rubber containing particles from tires are known in the art. The used tires (or shreds or granules thereof) can be subjected to an optional cleaning step (e.g., a water wash). Tires can be recycled by subjecting them to an initial shredding step, then subjecting the shreds to a granulation process to yield an initial granulate having dimensions of 1-3 cm. Grinding can be conducted under ambient conditions (e.g., in a granulator or a cracker mill) or cryogenic conditions.

Ambient grinding is a multi-step processing technology that uses a series of machines (usually three) to separate the rubber, metal, and fabric components of the tire. Whether using granulation equipment or cracker mills, the first processing step typically reduces the original feedstock to small chips. The second machine in the series will grind the chips to separate the rubber from the metal and fabric. Then a finishing mill will grind the material to the required product specification. After each processing step, the material is classified by sifting screens that return oversize pieces to the granulator or mill for further processing. Magnets are used throughout the processing stages to remove wire and other metal contaminants.

In the final stage, fabric is removed by air separators. Rubber particles produced in the granulation process generally have a cut surface shape and rough texture, with similar dimensions on the cut edges.

Cracker mills use two large rotating rollers with serrations cut in one or both of them. The roll configurations are what make them different. These rollers operate face-to-face in close tolerance at different speeds. Product size is controlled by the clearance between the rollers. Cracker mills are low speed machines operating at about 30-50 RPM. The rubber usually passes through two to three mills to achieve various particle size reductions and further liberate the steel and fiber components. These mills do not have screens built into the mill and as such the mill itself does not control the final particle. A stand-alone screening system will separate "sized" particles from oversize granules following the mill and re-circulate the oversize products. The particles produced by the cracker mill are typically long and narrow in shape and have a high surface area.

Cryogenic processing uses liquid nitrogen or other materials/methods to freeze tire chips or rubber particles prior to size reduction. Most rubber becomes embrittled or "glass-like" at temperatures below −80° C. The use of cryogenic temperatures can be applied at any stage of size reduction of scrap tires. Typically, the size of the feed material is a nominal 2 inch chip or smaller. The material can be cooled in a tunnel style chamber, immersed in a "bath" of liquid nitrogen, or sprayed with liquid nitrogen to reduce the temperature of the rubber or tire chip. The cooled rubber is size-reduced in an impact type reduction unit, centrifuge, or hammer mill. This process reduces the rubber to particles ranging from ¼ inch minus to 30 mesh, with the majority of the particle distribution between ¼ inch minus and 20 mesh. A typical throughput is 4,000 to 6,000 pounds per hour. Cryogenic grinding avoids heat degradation of the rubber and produces a high yield of product that is free of almost all fiber or steel, which is liberated during the process.

Wet grinding, is a processing technology used to manufacture particles that are 40 mesh and finer. The wet grind process mixes partially refined crumb rubber particles with water creating a slurry. This slurry is then conveyed through size reduction and classification equipment. When the desired size is achieved, the slurry is conveyed to equipment for removing the majority of the water and then drying. Aside from the use of water, the same basic principles that are used in an ambient process are utilized in a wet grinding process. The major advantage for a wet grind process is the ability to create fine mesh crumb rubber. While products as coarse as 40 mesh are produced, the majority of the particles are 60 mesh and finer. A percentage of the overall throughput is finer than 200 mesh. Another advantage for a wet grind process is the cleanliness and consistency of the crumb rubber produced. The process washes the crumb rubber particles. The wet process removes the fine particles of fiber from the crumb rubber making a very clean product.

The initial granulate contains steel, rubber, and textile components. The steel is typically recovered using a multistage magnetic separation process to minimize the loss of rubber. This can entail a first step utilizing a high strength twin pole overband cross belt separator magnet to remove metal containing particles in a first step. The second step involves a magnetic drum separator or magnetic pulley utilizing high strength rare earth magnets. The axial magnetic field causes the metal containing particles to tumble and release entrapped rubber. For fine rubber material that is fed into a powder grinder, a plate magnet suspended close to the product over the conveyor can lift and remove fine wire fragments. Testing can be conducted to determine metal content, e.g., by using a magnetometer.

The fiber can be recovered using modified gin machinery as known in the textile industry. A two step process is typically employed, where clean fiber is removed from EOL tire crumb using a modified gin cylinder cleaner (used in the textile industry to remove foreign matter from seed cotton). Partially cleaned crumb is subjected to a second step to remove fiber, which can still contain some rubber particles. The resulting cleaned EOL tire crumb is then collected for packaging or other use. See, e.g., W. Stanley Anthony, Applied Engineering in Agriculture, Vol. 22(4): 563-570.

American Society for Testing and Materials (ASTM) has standards for specifying different size ranges of crumb rubber, such as 30 mesh or 80 mesh. The range of particle sizes can be determined by sieve analysis, consisting of shaking and tapping a measured quantity of a crumb rubber sample through a specified number of test sieves over a specified time. The amount of sample retained on each screen is weighed and results are given as the percentage of sample retained on each screen. The recommended procedure for sieve analysis using the Rotap method is provided in ASTM 5644. Typical crumb rubber sizes directed to certain products and uses include the following: molded and extruded products, 4-100 mesh; asphalt modification, 16-40 mesh; sport surfacing, ¼"-40 mesh; automotive products, 10-40 mesh; tires, 80-100 mesh; rubber and plastic blends, 10-40 mesh; and construction, 10-40 mesh.

There are no unified U.S. standards for processing EOL tire rubber crumb; however, a suitable EOL tire rubber crumb for use in interlinked substitution typically has a low fiber content (less than 0.02% of total weight), low metal content (less than 0.01% of total weight), high consistency, and the particles are preferably sized for 100% pass through 16 mesh. In some embodiments, it may be acceptable to have particles of larger size, e.g., 14, 12, or even 10 mesh. For example, 10-40 mesh crumb rubber (e.g., 30 mesh, or 25-35 mesh) yields satisfactory results when processed according to the methods described herein. Smaller particles, e.g., 41-200 mesh, can be employed and may enable more efficient interlinked substitution; however, a reduction in particle size will incur greater expense in manufacture of the crumb of the specified size. Larger particles, e.g., less than 10 mesh (4-9 mesh) can also be subjected to the methods, e.g., for particle size reduction purposes.

ASTM D5603 Standard Classification for Rubber Compounding Materials—Recycled Vulcanizate Particulate, classifies vulcanized particulate rubber according to maximum particle size, size distribution and parent materials including whole tires, tire peels, buffings generated from the tire tread and shoulder, buffings generated from tire tread, shoulder and sidewall and non-tire rubber.

End-of-Life Tire Crumb Characterization

EOL tire rubber crumb containing vulcanized rubber and having the desired particle sizes can be manufactured or obtained from any suitable commercial source.

As discussed above, the EOL tire rubber crumb is typically of such a size that 100% can pass through a 16 mesh screen, and may further have a narrow size distribution (e.g., no smaller than 20 mesh and no larger than 16 mesh) or may have a broader size distribution (e.g., significant contents of fines and various other particle sizes less than 16 mesh). The crumb rubber is typically cleaned of fiber and wire to a purity of 99.9 wt. % (i.e., 0.1 wt. % or less of fiber and wire); however, as discussed above, in some embodiments such extraneous materials (one or more of fiber, wire, carbon black) may be permitted to remain present.

If the sulfur content of the EOL tire rubber crumb is unknown, representative samples of the EOL tire rubber crumb can be tested to determine sulfur content (typically measured in parts per hundred weight), such that a controlled amount of reactant can be used in the extraction process, thereby avoiding overutilization or underutilization of reactant. However, the methods of the embodiments are generally suitable for use on rubber possessing any degree of vulcanization, such that knowledge of sulfur content is not necessary for processing of the vulcanized rubber. Should it be desired to determine sulfur content, any suitable method can be employed, e.g., a nitric compound extraction process. ASTM D4578 describes standard test methods to apply to rubber chemicals for determination of percent sulfur. These test methods cover the determination of solvent insoluble materials in a sulfur-containing sample. The two test methods are: (1) Test Method A, Extraction by Carbon Disulfide, and (2) Test Method B, Extraction by Toluene. If there are no other solvent insoluble materials present in the sulfur-containing sample, the test methods determine the insoluble sulfur content directly. If other materials are also present, additional testing is necessary to identify what portion of the insolubles (e.g., carbon black, silica, or other inert fillers) is insoluble sulfur.

Sulfur Crosslinking of Rubber

Elemental sulfur has cyclic eight atoms molecules at room temperature. In the presence of accelerators and activators, elemental sulfur generates sulfur fragments that react with reactive groups of rubbers in the process of interlinked substitution to create cross-links such as:

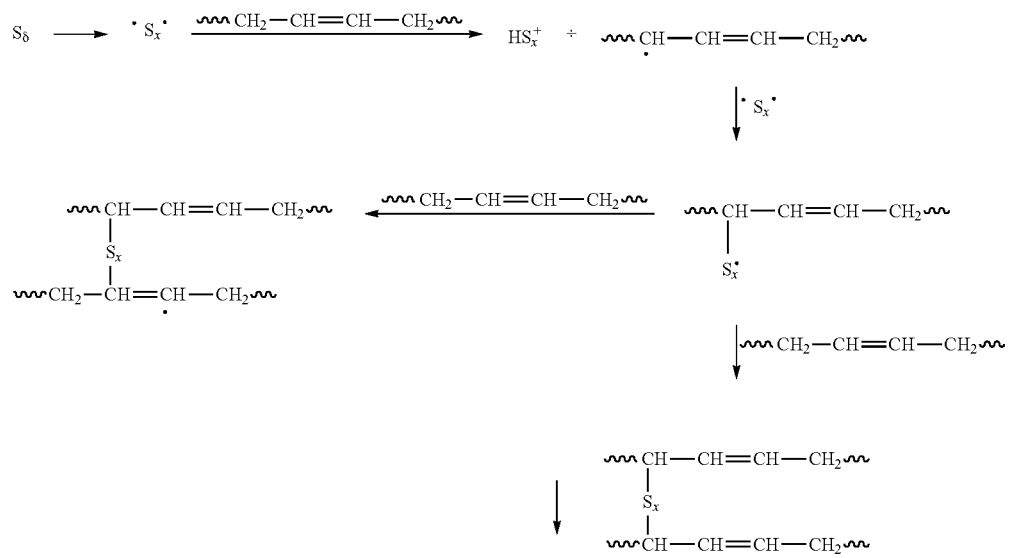

EOL tire rubber crumb is subjected to a chemical treatment with a reactant to induce interlinked substitution. The reactant comprises a metal salt having octahedral molecular geometry and a melting point in the range of 100–150° C. Examples of suitable reactants include cobalt acetate (CAS 6147-53-1; Co(OAc)$_2$,) and copper acetate (CAS 6046-93-1; Cu(OAc)$_2$,), although other reactants can be employed, as discussed elsewhere herein. The reactant is typically employed at from 0.1 to 5.0 parts reactant per hundred parts vulcanized rubber (by weight); however, higher or lower amounts may also be employed in certain embodiments. The amount of reactant employed can be increased or decreased depending upon the content of sulfur in the EOL tire rubber crumb to be treated, or the desired degree of interlinked substitution to be obtained. For example, a ratio of reactant molecules to sulfur bonds of 1:1, 4:6, 1:2, or any other suitable ratio can be employed to achieve a preselected degree of interlinked substitution.

Regenerating an Interpenetrating Elastomer Network from Ground Tire Rubber Particles In one embodiment, progressive elements are employed to regenerate a monolithic, macro-structural, interpenetrating elastomer network morphology from ground tire rubber particles. Element 1 involves providing an electro-mechanical reactor environment (EMRE) to support Boltzman "Phase Space" mediators which unpack the GTRP then realign sulfidic bridge chains for final compounding. Element 2 involves preparing a GTRP slurry for EMRE processing. Element 3 involves subjecting GTRP to differential-cyclical mechanical stress and steric electro-polarization. Element 4 involves subjecting the GTRP slurry to engineered, cavitation-induced thermal and acoustic shockwave excursion(s). Element 5 involves generating a chemotactic, sulfidic-bridge-tether-effect. Element 6 involves production of chemical reaction products and timeline. Element 7 involves compounding regenerated GTRP into a fully-integrated, monolithic, macro-structural elastomeric material.

In Element 1, an electromechanical reactor environment (EMRE) provides an effective "Phase Space" environment to 1) unpack the GTRP and reset the vulcanization precursor for 2) subsequent sulfidic bridge realignment, 3) with minimal alteration to the native, elastomer-filler matrix. FIG. 1 an EMRE head. The head comprises a 16 inch stainless steel rotor 101 with a variable tip speed and maximum 15,000 fpm. A 17 inch stainless steel stator 102 is also employed having a hundred and ten slots (cavitation portals) 103. The components generate a GTRP slurry flow pattern 104 as depicted in FIG. 1. In FIG. 1, detail of the cross-section along line 'A' is provided. While an EMRE as depicted in FIG. 1 can be advantageously employed, other mechanical platforms may be configured as reactors employed in the methods of the embodiments, e.g., progressive cavity pumps, screw pumps, extruders, or the like.

Figure 2:
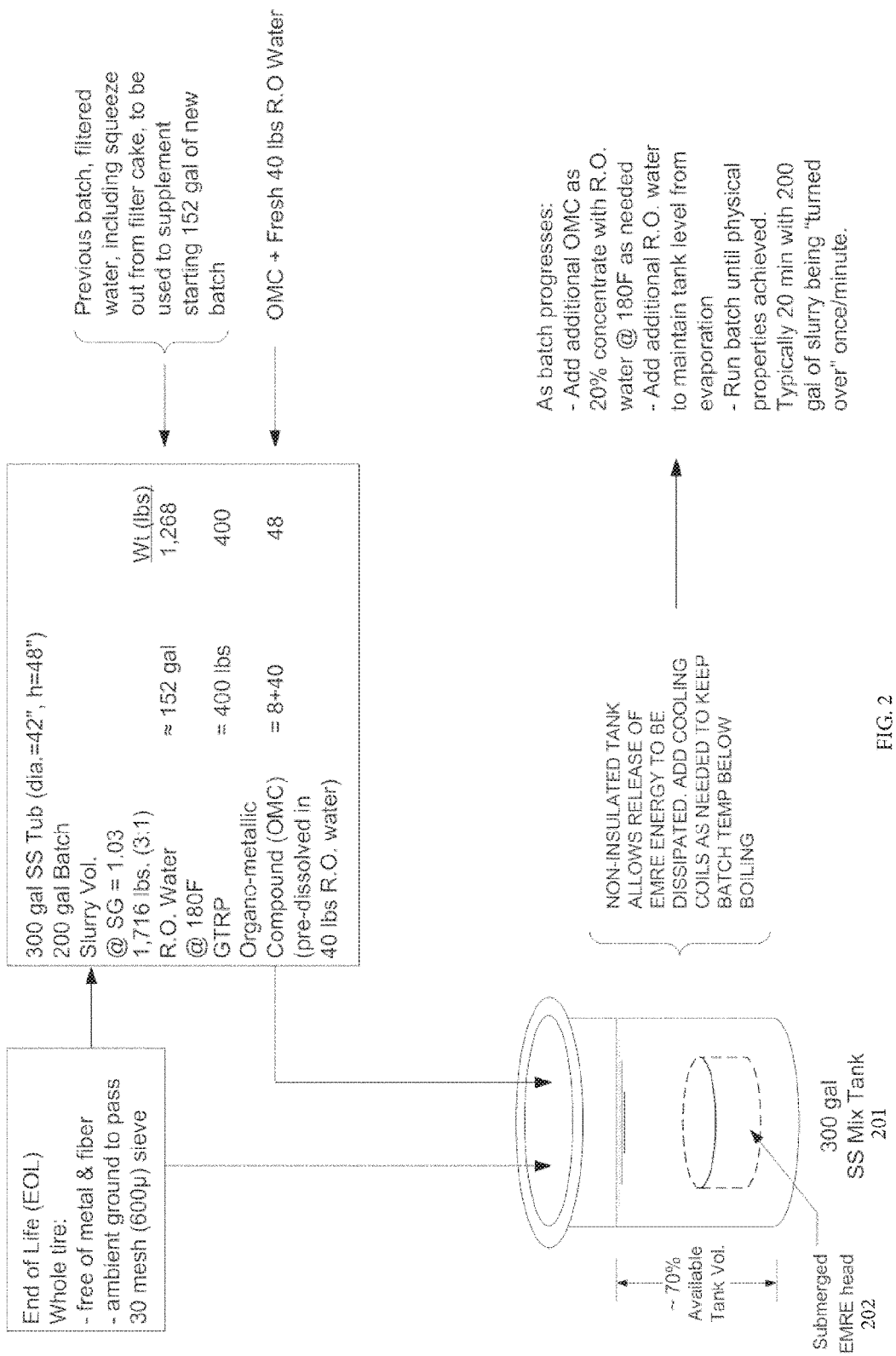
FIG. 2 depicts a process for preparing a GTRP slurry for the EMRE of FIG. 1, utilizing a submerged EMRE head 202 in a mix tank 201.

In Element 2, the GTRP slurry is prepared. FIG. 2 depicts a process schematic for this process involving a stainless steel mix tank 201 containing a submerged EMRE head 202. In operation, the tank is generally filled to about 70% of the available tank volume. The slurry is prepared from EOL whole tire that has been subjected to conventional processes to remove metal and fiber, and is ground to pass through a 30 mesh (600 micron) sieve. In the example process depicted in FIG. 2, a 300 gallon stainless steel mix tank is employed to produce a 200 gallon batch of EOL tire rubber slurry having a specific gravity of 1.03. The stainless steel tank can be non-insulated to allow dissipation of EMRE energy (thermal energy). In certain embodiments, cooling coils can be added to permit the batch temperature to be maintained below a boiling temperature or, alternatively, the process tank can be sealed to allow operation at higher temperature under pressurized conditions. The batch of EOL tire rubber slurry weighs 1716 lbs when a 3:1 ratio of water to GTRP. The components of the slurry in FIG. 2 include approx. 152 gallons of reverse osmosis (RO) water, approx. 400 lbs of GTRP, and approx. 8 lbs of copper acetate (referred to as organometallic compound or OMC) predissolved in approx. 40 lbs RO water. Filtered water recovered from a previous batch, including water squeezed out from a filter cake, can be used as a portion of the approx. 152 gallons of water used to prepare a batch. It is generally preferred to use fresh RO water for dissolving the OMC; however, in some embodiments recovered water can also be advantageously employed.

In Element 3, the GTRP of the slurry traverses a "Phase Space Tunnel" where differential-cyclical mechanical stress and steric field polarization are applied to the GTRP. The concept of "Phase Space" depicted herein (sometimes referred to as a Tunnel) was first put forth by Boltzman as a "box" in which molecular structures and velocity are quantified against a time interval when the "contents" of the box undergo outside influence(s). When the "box" environment is induced with entropy-enthalpy-entropy phase changes in short, time-oscillating-intervals, enormous energy forces (velocity) are unleashed within the "box". This process is schematically depicted in FIG. 3A, with linear distance, GTRP geometry, velocity, and acceleration profile depicted as a function of time over a timeline extending from 0.000 sec. to 0.0019 sec. Time 0.000 is when the particle impinges upon the EMRE rotor 301. The GTRP is then subjected to compression in the stator (compression gate 302), exits the stator, and enters into a recirculation pattern. As depicted in FIG. 3B, the space between the EMRE rotor 301 and the exit of the compression gate 302 is referred to as the Phase Space Tunnel 303. A modulated AC current can optionally be applied at the compression gate to facilitate the process. Electrodes 304 are provided that introduce a modulated AC current. From 0 (or no oscillation) to 100 Hz oscillation can be applied, or oscillation up to 1000 Hz or more can be applied by employing a frequency controller. Voltages up to 300 V or more can be applied to induce current flow across the slurry medium, which has the effect, through the rapid reversing of polarity, of depositing electrons upon the surface of the rubber particles in the phase space tunnel. The process of compression in the stator deforms the GTRP such that the ratio of width to length increases to 6:1. The "trampoline" effect of rapid compression-stretching-decompressing assisted by a modulated, AC current flow across the stator slot, enhances the steric effect of repulsion between overlapping electron clouds with subsequent accelerated delamination of the GTRP bound matrix, as depicted in FIG. 3C. For a 600 micron particle with approximately 1200 transverse sulfidic crosslinks, 60 dislocated and repotentiated vulcanized precursor sites are regenerated per pass through the stator. It is noted that the EMRE depicted in Element 1 is an embodiment of the Parallel Continuous Flow Micro-synthesis Reactor (PCMR) hardware described elsewhere herein, principally as it avoids the necessity of building and certifying a pressure vessel for conducting the process of the embodiments. However, the PCMR, operating at a fixed temperature along a water-to-steam curve is able to produce similar "Phase Space" particle-unpacking results with the GTRP as the Element 1 EMRE embodiment in the five quanta of "Timeline", "Linear Distance", "GTRP Geometry", "Velocity" and "Acceleration Profile" depicted in FIG. 3A by pushing the GTRP slurry through strategically positioned, mechanically larger diameter apertures (e.g., an adjustable iris valve) which allow the slurry volume to expand, whereupon it goes into a gas phase, then be immediately reduced back to the original, internal pipe diameter. With the slurry temperature versus pressure induced to oscillate in and out of a steam-liquid-steam cycle, GTRP unpacking efficiencies are equivalent. With each pass through the rotor, particle size is reduced. At a reduction to a size of 200 mesh (70 microns), approximately 65% of the crosslinking bonds are disrupted, and the particles may be mechanically leafed into thin, pancake-like structures (e.g., 'smeared out' into a 10 micron film). Further size reduction is typically not sought after. At a reduction to 5-60 microns, carbon black starts to come out of the particle matrix. At a reduction to a size of 5 microns, reduction of carbon begins to occur. A particle size of 200 mesh (70 microns) is generally useful for most applications, such as tire, roofing, and paving applications; however, in some embodiments sizes down to 10 micron can be desirable.

Figure 4A:
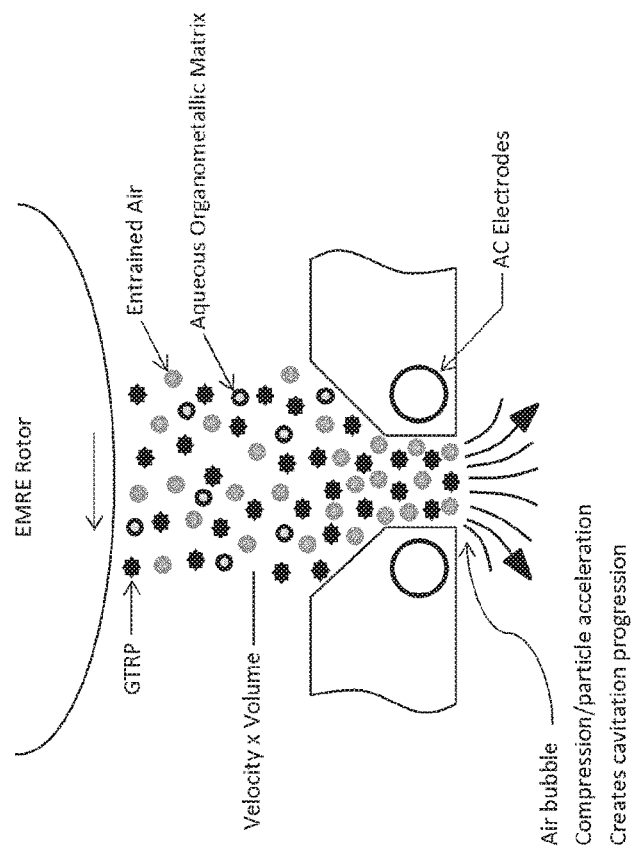
FIG. 4A depicts the process of cavitation as generated by the EMRE rotor 401 and the compression gate 203 as entrained air 406, GTRP 405, and aqueous organometallic matrix 407 pass through the compression gate.
Figure 4B:
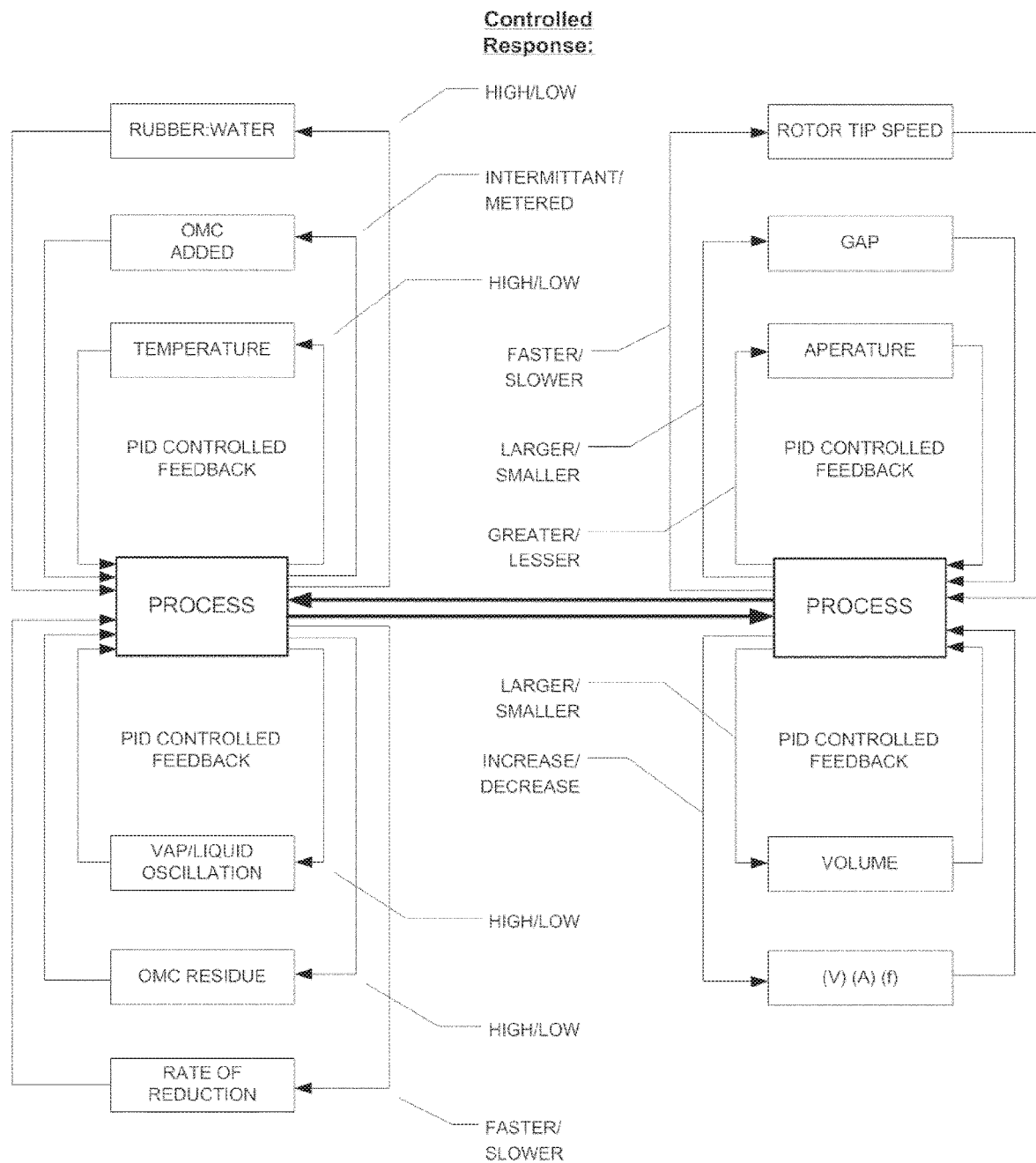
FIG. 4B includes process control variables for control of conditions in the phase space tunnel region.

In Element 4, an engineered, cavitation-induced, acoustic shockwave is applied to the GTRP. As shown in FIG. 4A, in the phase space tunnel between the EMRE rotor 401 and the compression gate 402, a mixture of GTRP 405, entrained air 406 and an aqueous organometallic compound matrix 407 is present at a velocity and volume. Upon exit through the compression gate 402, air bubble compression and particle acceleration creates a cavitation progression 408. As the slurry exits, lower pressure completes the cavitation cycle with an implosion of air cavities. It is generally preferred that no bulk-phase change occur within the continuous water phase of the slurry during cavitation. Therefore temperature and pressure differential excursions take place on an atomic scale. This process generates extreme temperature and pressure differential excursions within the nano-regions, cavitation cone in a range of $10^{2\circ}$ F.-$10^{15\circ}$ F. for temperature, 60 m/sec-180 m/sec for acoustic wave velocity, all occurring over a time interval of $10^3$ sec$^{-1}$-$10^8$ sec$^{-1}$. By changing the rotation speed of the EMRE rotor and/or slurry viscosity and/or stator gap, manipulation of energy "leverage" within the phase space tunnel can be accomplished. FIG. 4B depicts process control variables for the GTRP slurry and EMRE. A proportional-integral-derivative controller (PID controller or three term controller)—a control loop feedback mechanism widely used in industrial control systems and a variety of other applications requiring continuously modulated control—is employed to control temperature, aperture size, the volume of the slurry, and oscillation between vapor and liquid. Other factors that can be adjusted, e.g., by PID controller, related to the reactants include the ratio of rubber to water, the OMC added (amount, rate of metering, intermittent or continuous metering), the amount of OMC residue, the rate of reduction. Apparatus related factors that can be adjusted, e.g., by PID controller, include the rotor tip speed and the gap size between the EMRE and the compression gate. FIG. 4C provides a table including a list of selected GTRP slurry control variables and results of modifying them. FIG. 4D provides a table including a list of selected EMRE process control variables and results of modifying them.

Element 5 illustrates a chemotactic sulfidic-bridge-tether-effect (SBTE) dynamic. FIG. 5A depicts the original sulfidic bridges schematically, including formation of pendant vulcanizate precursors that occurs predominantly at a methyl carbocation (originally forms at approx. 140° C.) and completed vulcanization that occurs primarily at an allylic carbocation (subsequently forms at approx. 160° C.). FIG. 5B depicts types of carbocations (with varying numbers of carbon atoms attached to the carbocation) in order of stability, with tertiary carbocations the most stable, secondary carbocations less stable, primary carbocations even less stable, and a methyl carbocation the least stable. Resonance adds stability to allylic carbocations as positive charge density is spread out, making it more stable than a secondary carbocation as depicted in FIG. 5B. The process of sulfidic bridge dislocation therefore preferentially occurs at a methyl carbocation rather than at an allylic carbocation. The result of the dislocation is that the rigid sulfidic bridge becomes a tether connected at the original allylic carbocation and becomes unbound at the methyl carbocation.

Figure 6A:
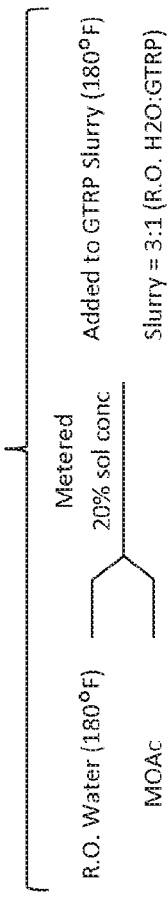
FIG. 6A depicts a summary of GTRP slurry formation.
Figure 6B:
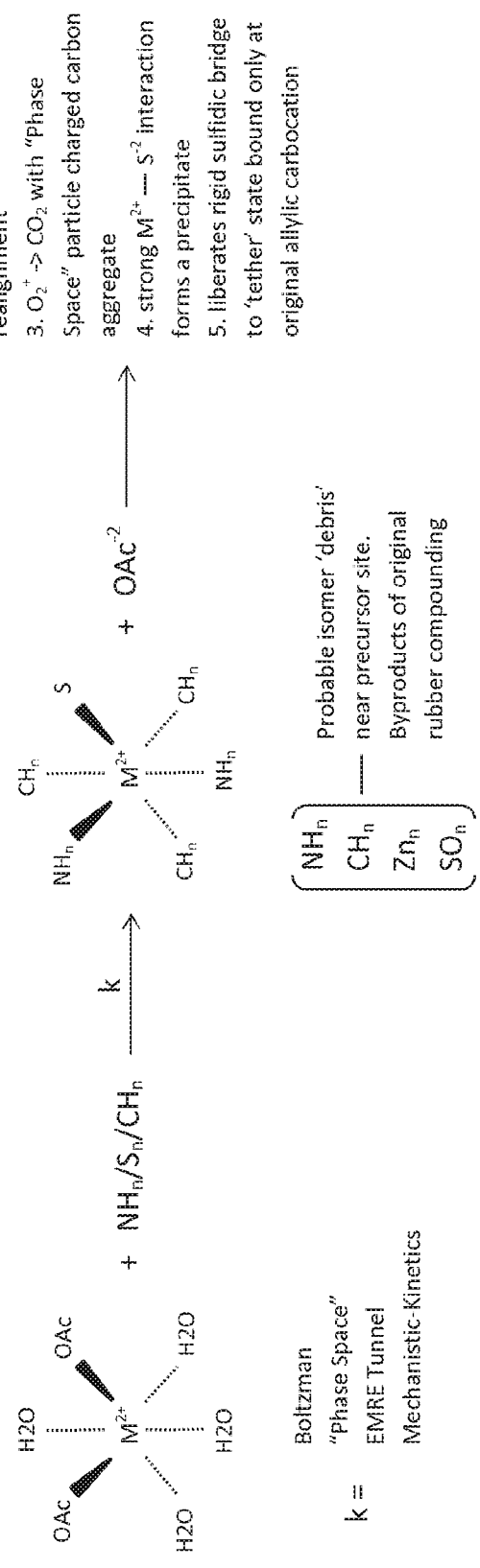
FIG. 6B depicts the process of an organometallic compound developing ligands in the process of an embodiment.

In Element 6, the chemical reaction occurs along a timeline. The RO water and OMC (in this case metal acetate or MOAc) in a 20% solution concentrate is mixed and metered into the GTRP slurry (180° F., 3:1 ratio by weight of RO water to GTRP), as depicted in FIG. 6A. The resulting chemical reaction is depicted in FIG. 6B. The organometallic compound dissolved in water associates with ligands, including transient aquo metal formations. In FIG. 6B, k refers to the Boltzman "phase space" EMRE tunnel mechanistic-kinetics, $M^{2+}$ refers to the metal ion; $NH_n$, $CH_n$, $Zn_n$ and $S_n$ refer to what are believed to be isomer 'debris' near the precursor site that are byproducts of the original rubber compounding process, and $OAC^{-2}$ refers to the acetate ion. The original tire vulcanization precursor, allylic hydrogen, scavenged by the MBTS amine group, previously described, forms reaction by-products. Nitrogen-sulfur compounds include ammonium disulfate $(NH_4)_2S_2O_8$ molecules (ADS), or radicals thereof, which reside and are compacted as debris isomers, proximate to the methyl carbocation. These nitrogen-sulfur isomers, which notably are not created during the final step of the original sulfidic-vulcanization at the primary carbocation of the sulfidic-crosslink upon the adjacent polymer chain, are highly soluble in water and become powerful oxidizers to drive the methyl carbocation substitution sulfidic-metathesis. The active OMC, a metal coordination complex, may either activate a hydration of the ADS molecule forming hydrogen peroxide $(H_2O_2)$ and/or become an accelerant to enhance that reaction in its targeted, metathesis action as an oxidizer in the methyl carbocation. The sulfidic-metathesis conversion rate at the methyl carbocation is assured without any peroxide and/or other oxidizer when the temperature threshold at the reaction site is greater than 240° F., above which the sulfur becomes labile in phase change. This may be induced by either a pressurized, phase change oscillation from water-to-vapor or a sudden, phase-space-cavitation implosion with bursts of hyper energy that result in a solid-to-liquid-to-solid phase change of both the sulfur and OMC compound at the methyl carbocation target site. To more fully appreciate the enormous energies released by the imploding cavitation cone, recent CERN studies on the subject have proposed that an electromagnetic plasma entanglement is formed during the pico-second deformation that is quite similar to the phenomena associated with the 300-times greater solar corona temperature as compared to the sun's surface. Following this analogy, for a 180° F. GTRP slurry, passing through the Phase Space Tunnel, the pinpoint, cavitation temperatures at the target methyl carbocation site would be expected to be, at a minimum, 54000° F. for a very brief moment.

While not wishing to be bound by any theory, it is believed that in the reaction, metal acetate ion dissociative substitution occurs at the methyl carbocation. This disrupts the vulcanization precursor, and the insertion forms a new functional site at the elastomer pendent structure for subsequent sulfidic bridge realignment. In the process, $O^{2-}$ is converted to $CO_2$ with a phase space particle charged carbon aggregate. Strong interactions between $M^{2+}$ and $S^{2-}$ form a precipitate, which liberates a rigid sulfidic bridge to a 'tether' state, bound only at the original allylic carbocation. Various metal ions are suitable for use, including but not limited to $Co^{2+}$ (ligand exchange rate for an $H_2O$ metal coordination matrix of $3\times10^6$), $Cu^{2+}$ (ligand exchange rate for an $H_2O$ metal coordination matrix of $5\times10^9$), $Ni^{2+}$ (ligand exchange rate for an $H_2O$ metal coordination matrix of $3\times10^4$), $Zn^{2+}$ (ligand exchange rate for an $H_2O$ metal coordination matrix of $2\times10^7$), and $Mn^{2+}$ (ligand exchange rate for an $H_2O$ metal coordination matrix of $2\times10^7$). Substantial data exists in literature that a copper based organometallic molecule can manifest up to a coordination number of ten (10) in a heated, water environment. This coordination capacity provides for the intermediate formation of a superfloppy matrix to assist the process by capturing a ligand from the inhibiting isomer 'debris' near the methyl carbocation reactive site. The ligand capture and release rates are many times faster than other metals as well. These impressive capabilities lead to the possibility that a variety of copper based, reaction isomers may be created from the heterogeneous maw of molecules present during the GTRP unpacking-metathesis sequence. By selecting an organometallic compound that exhibits a phase change at a temperature close to that of elemental sulfur, it may be possible to facilitate the metathesis reaction; however, organometallic compounds having different phase change temperatures can also be employed.

Figure 7A:
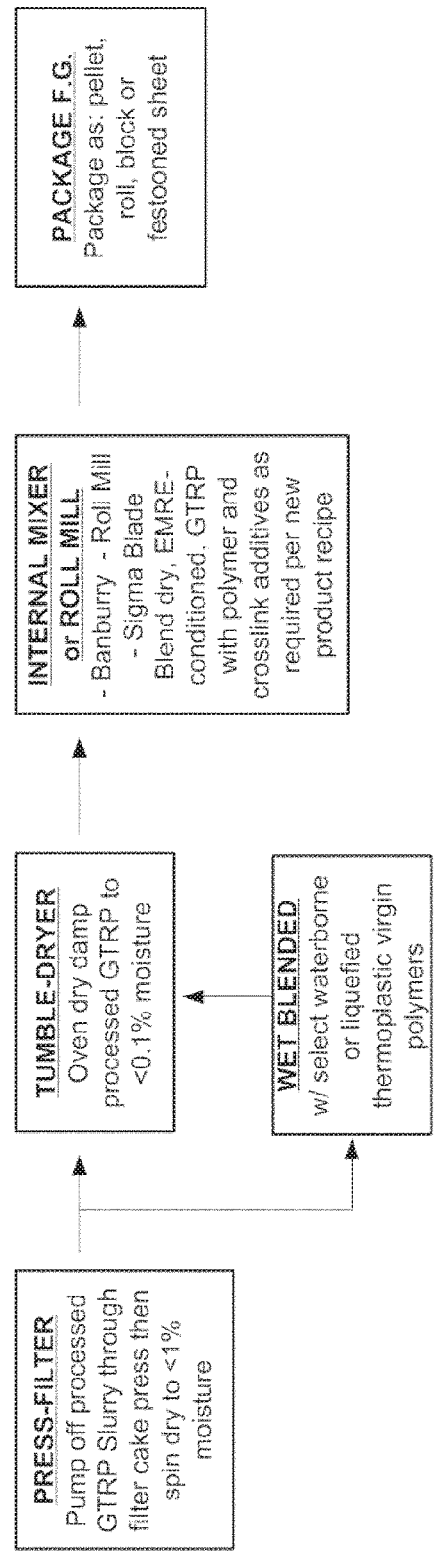
FIG. 7A depicts the morphology of ground state vulcanized GTRP, EMRE-conditioned GTRP, and a regenerated interpenetrating elastomer network of treated rubber.

In Element 7, fabrication of a monolithic, rubber macrostructure occurs. FIG. 7A depicts the macrostructure of ground state vulcanized GTRP (Stage 1), EMRE conditioned GTRP (Stage 2) including unbound, pre-reptated internal morphology, and regenerated interpenetrating elastomer network (Stage 3) which includes intermingled laminates spaced apart by 10 nm to 5 microns. One of the features of the process of the embodiments is that crosslinks are reestablished in the interpenetrating elastomer network by a gentle process that leaves carbon black undisturbed. This yields a slight reduction in tensile strength, but an improvement in rebound strength.

Figure 7B:
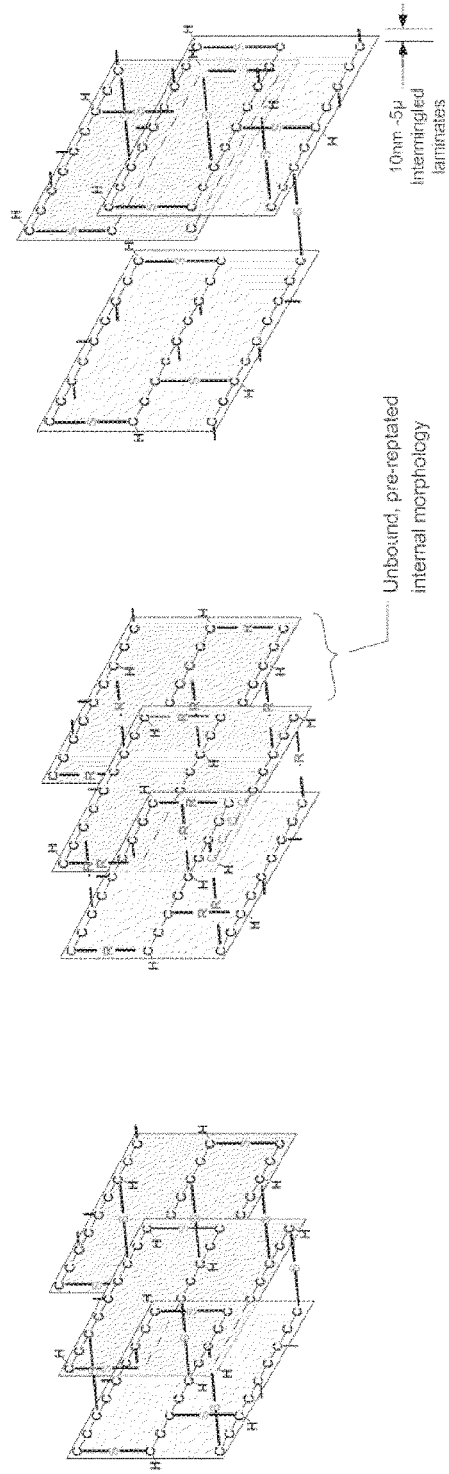
FIG. 7B provides a flowchart of fabricating a monolithic rubber macro structure including a regenerated interpenetrating elastomer network.

In the fabrication process, as depicted in FIG. 7B, the processed GTPR slurry is pumped off and through a filter cake press, the spin dried to a moisture content of less than 1% by weight. The resulting processed GTRP can be oven dried in a tumble dryer to a moisture content of less than 0.1% by weight to yield a dry, EMRE-conditioned GTRP. Between the press filter step and the tumble dryer step, select waterborne or liquefied thermoplastic virgin polymers can optionally be wet blended into the processed GTRP. The dried GTRP can be subjected to an internal mixer (e.g., a Banbury mixer, a sigma blade, or the like) and/or a roll mill for micro-laminate, where dry, EMRE-conditioned GTRP is blended with polymer and crosslink additives. The resulting product can then be packages as pellet, roll, block, festooned sheet, or the like. In certain embodiments, the processed GTPR slurry is a valuable product for use without any further processing steps. The GTRP can be mixed with asphalt to form rolls and sheeting, or melted to bind aggregate, or to form an emulsion. Similarly, product in any of the intermediate steps in Element 7, including press filtration, tumble drying, wet blending, internal mixing, and packaging can be a valuable product in its own right. Accordingly, any of the steps of Element 7 can be considered optional in various embodiments. It is noted that when a roll mill is employed, the resulting GTRP is 'leafed' into thin pancake-like structures that will form during subsequent vacuum forming, imparting anisotropic properties to the resulting GTRP sheet. When an internal mixer is employed, resultant sheets made therefrom are substantially isotropic.

A mixture of asphalt and GTRP can be prepared by various methods. As a first step, GTRP is run through a finishing roll mill until a 'leafed' or 'fully leafed-reptated' form is obtained (having, e.g., an approx. 10 μm or smaller particle thickness in the smallest dimension), and then roll-mill or internal mixer combined with asphalt. Typically, a cohesive GTRP sheet (indicative of a 'leafed' form) can be obtained after 10 passes through a finishing roll mill with cold rolls, or 2 passes through a finishing roll mill with hot rolls. Once a cohesive GTPR sheet is formed, it can be combined with asphalt. In one embodiment, asphalt is added to the cohesive GTRP sheet on the finishing roll mill, then mixed in by action of the finishing roll mill to yield a mixture of 92% by weight GTRP and 8% by weight asphalt in the form of a continuous GTRP/asphalt sheet. Type IV asphalt can advantageously be employed; however, an asphalt in a 5 pen to 200 pen range can also be employed. A crosslinking agent can optionally be added with the asphalt (e.g., 0.005 phr (parts per hundred) of the continuous GTRP/asphalt sheet). The sheet can advantageously be turned during the process to facilitate a uniform distribution. A cohesive GTRP sheet ('leafed') or continuous GTRP/asphalt sheet can be further combined as hot melt with asphalt in any form, e.g., particles, emulsion, or hot mix. Revulcanization can advantageously be accomplished after the GTRP/asphalt blend is in situ installed.

In paving applications, for example, a cohesive GTRP sheet or continuous GTRP/asphalt sheet can be melted into asphalt to yield a composition comprising from about 20-50% by weight GTRP, e.g., suitable for use as a binder for aggregate. In another example, the continuous GTRP/asphalt sheet can be applied in sheet form to a damaged pavement, then conventional hot mix, aggregate, or a mixture of aggregate and binder can be applied as a top layer on the continuous GTRP/asphalt sheet. Irradiation can advantageously be applied to induce crosslinking and binding of the GTRP. When employed in asphalt as a binder, or in an underlayment comprising a continuous GTRP/asphalt sheet, the GTRP can advantageously be cured in place on the road bed using an emitter system and associated apparatus and methodology as described in U.S. Pat. Nos. 8,992,118, 9,169,606, 9,074,328, 9,347,187, 9,481,967, 9,551,117, 9,551,114, 9,624,625, 9,637,870, 9,127,413, and 9,057,163, the contents of each of which are hereby incorporated by reference in their entireties. Such an emitter system for irradiating asphalt/concrete pavement typically includes a structural frame holding an emitter panel configured to emit a peak wavelength of radiation of from 1000 to 10000 nm to achieve flux of the asphalt in the asphalt/concrete pavement. The terms "flux" or "fluxing" as used herein are broad terms, and are to be given their ordinary and customary meaning to a person of ordinary skill in the art (and is not to be limited to a special or customized meaning), and refer without limitation to describe a fluid that is displaceable by application of minimal pressure against a body of the fluid. Temperatures in a range as high as 190° F. to 290° F. (88° C. to 143° C.), e.g., 250° F. to 290° F. (121° C. to 143° C.) can advantageously be employed to induce flux of asphalt. For irradiation of GTRP to induce crosslinking, radiation having a peak wavelength in a range of 350 nm to 700 nm peak can advantageously be employed, and can be used in addition to radiation having a peak wavelength of 1000 nm to 10000 nm (e.g., two peak wavelengths). Some degree of crosslinking will occur in the absence of the addition of crosslinking agents; however, additional crosslinking agents can boost the speed and efficiency of the process. It is noted that a temperature of 170° F. can induce crosslinking when DIBP is employed as a crosslinking agent, making it advantageous for use in GTRP/asphalt sheet where stability and controlled crosslinking is desired. When dicumyl peroxide is employed as a crosslinking agent, crosslinking will rapidly occur even the absence of applied heat. Dicumyl peroxide can be advantageously employed as a crosslinking agent when the GTRP/asphalt is in liquid form (e.g., emulsion). Paving material comprising GTRP exhibits superior properties in terms of longevity when compared to conventional paving materials including ground tire rubber that has not been subjected to any treatment.

The continuous GTRP/asphalt sheet can be used in the form of rolls and sheeting for weatherproofing or roofing applications. Alternatively, the cohesive GTRP sheet ('leafed') or continuous GTRP/asphalt sheet can be melted into asphalt or another solvent and the resulting mixture applied to a surface by spraying, yielding a sealed and waterproofed surface. The resulting rubber particulate is also of a quality suitable for use in house shingles and roll roofing, offering hail damage resistance, improved cold temperature flexibility (e.g., flexibility down to a temperature of at least −40° F.), and reduced softening, bleed out and staining in hot weather. The roll roofing containing rubber particulate can be placed dry and then subjected to irradiation, causing the sheet to melt, conform, crosslink, and adhere to an underlying substrate (e.g., insulation or old roofing). A liquid mixture containing GTRP can be subjected to irradiation to induce crosslinking. Irradiation can be applied using an emitter system similar to that described above for paving applications (e.g., U.S. Pat. Nos. 8,992,118, 9,169,606, 9,074,328, 9,347,187, 9,481,967, 9,551,117, 9,551,114, 9,624,625, 9,637,870, 9,127,413, and 9,057,163, the contents of each of which are hereby incorporated by reference in their entireties). Electromagnetic radiation of a preselected peak wavelength can be applied to the roofing or waterproofing sheet or spray in place. The heating radiation can be generated by modifying an emitter to emit a desired wavelength. The wavelength of the electromagnetic radiation used for heating is selected based upon the materials present in the roll roofing. Preferred peak wavelengths for targeting rubber in the roll roofing are in a range of 350 nm-700 nm peak wavelength at watt densities of less than or equal to 10 watts/in$^2$. The radiated energy applied to the roll roofing heats the rubber in the roll roofing while minimizing heating of the substrate. The emitter device can be manufactured to minimize cost and are suitable for use in the field. Field use can be achieved by powering the device using a portable generator, e.g., a Tier 4 diesel engine, electrically connected to one or more emitter panels situated within a metal frame. The emitter can be insulated with, e.g., a high-density ceramic, and the panel(s) can be nested within the ceramic liner of a frame to point towards the plane of the roll roofing.

Drying of the post-reactor GTRP blend can be conducted to any desired degree. Moisture can be removed slowly or quickly. Gentle drying will have minimal impact on the structure of the elastomer network morphology. Drying with shear typically yields smaller particle size and quicker evaporation of moisture.

Curing of the post-reactor GTRP blend can be conducted slowly or quickly, by use of chemical curing agents, or by irradiation (e.g., by an emitter system as discussed elsewhere herein).

In some embodiments, it can be desirable to combine dried post-reactor GTRP with a solid polymer (e.g., virgin rubber) by dry blending, then subjecting to further processing to mix the components. Alternatively, a latex with a certified number of reactive sites can be combined with the post-reactor GTRP and subjected to further processing. Water can later be removed, e.g., by squeezing. Post-reactor GTRP can be modified for various uses, e.g., as a thermoplastic, thermotrope, or thermoset. The polymer backbones are predisposed for vulcanization. Because the post-reactor GTRP is hydrophobic, hydrophilicity is imparted to the material to permit it to be emulsified or formed into a colloidal suspension. Properties can be modified by adding a homopolymer to functionalize the backbones. To impart thermoset properties, the particles can be coated (e.g., with nonylphenol ethoxylate). To impart thermoplastic properties, hydrophilic sites can be inserted (e.g., with quaternary amine).

As discussed herein, subjecting GTRP to oscillation across the steam/water phase pumps liquid into the caverns of the particles. This can saturate the parties very quickly, e.g., less than one minute. During the reactor process, water can inundate the particle such that a large increase in free molecular space is observed, e.g., 500% or more, e.g., a five-fold increase. This results in a dried particle that can be described as "fluffy". Dried GTRP possess "caverns"—internal spaces (free molecular spaces) that can accommodate liquids. Application of shear forces to GTRP can collapse these caverns. When GTRP is provided as a colloidal suspension with a material to be mixed, the presence of caverns facilitates internalization of materials in a liquid in the caverns of the GTRP. Such materials can include waterborne polymers. This can result in superior polymer dispersion properties compared to conventional solid upon solid mixing as is the primary method of polymer blending in the tire industry, for the resulting particle, e.g., superior tensile strength, hysteresis, and shear. An improvement in physical strengths of 200-300%, or more, from what is observed in rubber typically utilized in the tire industry can be observed.

Based upon physical property analysis of samples composed of post-reactor GTRP blends with small quantities of virgin, styrene, 1,4-cis polybutadiene polymer, greater than approximately 80% crosslink density, as compared to a virgin, tire-grade, black master batch compound, can be regularly achieved using a dicumyl peroxide (DCP) catalyst cured for two hours at 240° F. DCP provides reactive cross linking below 240° F. but curing temperatures above that threshold liquefies the tethered sulfuric chain such that its labile state will more efficiently complete the re-alignment. Another effective accelerator is di(tert-butylperoxyisopropyl)benzene (CAS No. 25155-25-3, also referred to as DBPI).

Silicone rubber (SiR), grafted with a 1,2-high vinyl butadiene homopolymer functionality, may be cross linked with mercapto group catalyst. Such blends will result in high crosslink densities and uniform, elastomer, interpenetrating domains which exhibit superior, hybridized properties known to both rubber groups. An NR/SBR black master batch SiR hybrid, using a regenerated EOL particle is a new, cost effective innovation.

In another embodiment, GTRP particles are size reduced and crosslink realigned in an anhydrous environment. EOL tire rubber crumb is preheated to a temperature of about 250° F. (e.g., 230° F. to 270° F., or 240° F. to 260° F., or 245° F. to 255° F.) in a three shaft vertical mixer or other suitable mixing apparatus. The reactant (e.g., copper acetate or other metal salt as described herein) in solid form is preheated to a temperature of 250° F. (e.g., preferably above the metal salt's melting point, e.g., up to 250° F. or more, e.g., 230° F. to 270° F., or 240° F. to 260° F., or 245° F. to 255° F.) in a separate vessel under inert atmosphere (e.g., nitrogen blanket). In certain embodiments, the inert atmosphere can be optional. The heated reactant is combined with the pre-heated EOL tire rubber crumb. For example, the heated reactant can be sprayed, misted, or poured into the pre-heated EOL tire rubber crumb under agitation to achieve uniform coating and distribution of the reactant on the pre-heated EOL tire rubber crumb, yielding an activated EOL tire rubber crumb. When added directly to the pre-heated EOL tire rubber crumb, the reactant can advantageously be provided in the form of a finely ground powder.

Applications for Interlinked Substituted Rubber Material

As discussed herein, the interlinked substituted rubber material of the embodiments is suitable for use in a wide variety of applications, including the tire and paving applications discussed above, or any other applications wherein virgin rubber would be employed. By using various, reactive adhesive matrices, e.g., hot melts (e.g., asphalt, SBR, polyisobutylene (PIB), and polyethylene (PE)) and multicomponent reactives (e.g., fatty acid based polyols), artifacts have been made and the properties have been evaluated. These properties suggest that the compounded interlinked substituted rubber material can effectively compete with much more expensive silicone, urethane, epoxy, and ethylene-propylene-diene terpolymer (EPDM) based materials at a fraction of the cost. The compounded interlinked substituted rubber material is waterproof, exhibits lightweight structural properties, is abrasion resistance, resists exposure to salt, common chemicals, and hydrocarbon based fuels, and exhibits superior thermal and UV resistance. An interlinked substituted rubber material having properties tailored for a particular application can be obtained by adjusting the process dynamics associated with the entangled polymer-nanoparticle composite that is the interlinked substituted rubber material. For example, in some instances smaller particle size is not necessarily desirable, and there are certain morphological features as described herein that can provide superior performance to virgin rubber. The nano-particles have a profound effect on the mechanical properties of the polymer; therefore, controlling the in-service, entropic-enthalpic interaction of the host polymer chain motion (constraint and relaxation), in all time-scales, can provide many benefits.

It is observed that interlinked substituted rubber material performance attributes can precipitously drop with a particle size reduction below a dimension which is less than about 5-10 times the random coil radius of the host polymer. This is based upon a model where the original compound from the ground tire generally has a nano-particle cluster:polymer, random coil ratio bias (in favor of the polymer) of greater than 1.0:1.0.

The over two hundred elements that go into making a tire may be manifest at greater than 90% (as element count) of the mass of individual GTR particles, suggesting that characterizing uniformity of the interlinked substituted rubber material may not be possible, but this is not so. The dependable method for abrogating sulfidic influence as in the methods of the embodiments is deliberately 'gentle' upon disrupting the chemical and intermechanical properties of the composite and a system for classifying uniformity is in development. The composite, viscosity observational puzzle(s) which contradict the Einstein-Batchelor viscosity law will have a partial resolution once the sulfidic component has become non-influential. As a simple method of characterizing the resultant process yield by correlating optimal, process intensity and articulation emerges, it is expected that the interlinked substituted rubber material can be employed in a variety of products, including high performance applications. Examples for high performance applications include in-situ, monolithic, structural, self-insulating, foamed panels. Dried and ground, indigenous carbonaceous, cellulose rich vegetation may be chopper-gun formed with the regenerated GTR as a principal binder (at high loadings) into small, permanent, earthquake proof habitats. Secondary containment spray applied membranes may be installed in tanks and ships. Robot-sprayed, plural component, chemically resistant and pressure stable linings may be installed in aging sewer and water pipes without excavation. UBC compliant, monolithic roofing membranes may be factory manufactured membranes or sprayed in-place. New civil infrastructure underground piping may be protected with more durable coatings derived from interlinked substituted rubber material. Marine structures of all types may be corrosion protected with anti-fouling, PTR-based, composite coatings. Almost any article being currently produced which must be insect and vermin-proof, fuel-proof, mold and bacteria-proof, sun and salt-proof can be manufactured for superior performance with an interlinked substituted rubber material-based shell.

Re-Engineered Elastomeric Polymer Synthesis

A re-engineered, elastomeric polymer (REEP) which has been previously cross linked with sulfur compounds requires a disruption of the sulfur link and an insertion of alternative chemistry if it is to enhance the final properties of the composition into which the REEP is targeted as an essential element. Such polymers can include, e.g., ground tire rubber, rubber of another source, other elastomers such as cis-1,4-polyisoprene, trans-1,4-polyisoprene, natural polyisoprene, synthetic polyisoprene, polybutadiene, chloroprene rubber, halogenated butyl rubber, nonhalogenated butyl rubber, styrene-butadiene rubber, hydrogenated nitrile rubber, nonhydrogenated nitrile rubber, or other unsaturated rubbers capable of being cured by sulfur vulcanization or having carbon-sulfur bonds in the polymer's backbone, e.g., —C—$Sn$—C, where n is an integer of two or more. Re-crosslinking enhances oxidation resistance and mechanical properties, thereby improving the stress-relaxation and/or performance spectrum. The final, re-cross linked properties of the REEP may advantageously impart a thermosetting (rigid) or thermotropic (elastic) character to the completed composition. Beneficial reptation (elastomeric polymer relaxation) during the processing of a REEP is more readily accomplished during the intra-cross link manipulation stage as well (e.g., in conjunction with interlinked substitution as described herein).

Sulfur vulcanized REEPs predominantly consist of polysulfidic bridges with bond energies of approximately 150 kJ/mol. Reducing these bridges to a mono- or di-sulfidic state substantially improves the oxidation resistance of the host elastomer, as the bond energies of mono- or di-sulfidic bridges are approximately 270 kJ/Mol. Employing a one-step, 'click' metathesis wherein the sulfur bond is hybridized is a desirable step in preparing the REEP for final compounding into an elastomer-containing product.

Utilizing a Parallel, Continuous-flow, Micro-synthesis Reactor (PCMR) to conduct a single-pass, molecular re-assembly of a REEP can be based on a real time insight into the effectiveness of the reduction-substitution effort within the developing polymer morphology if it is to yield desired, post-reactor, dynamic mechanical analytics. Interacting polymer dipole moment within thin, "on-the-fly", loop delayed, cross sections of the reactor flow to an external, modulated electrical field, while capturing both permittivity and the field, curl gradient deviations, provides pinpoint differential data as to the changes taking place as a result of up-stream dosing stations. It also provides essential, intervention directives as to what additional electro-chemical 'input menu' might be required to achieve desired, final properties as the polymer completes the PCMR progression. Similar advantages can be ascertained within a PCMR environment by the utilization of curl gradience amplification (CGA) technology.

Figure 8A:
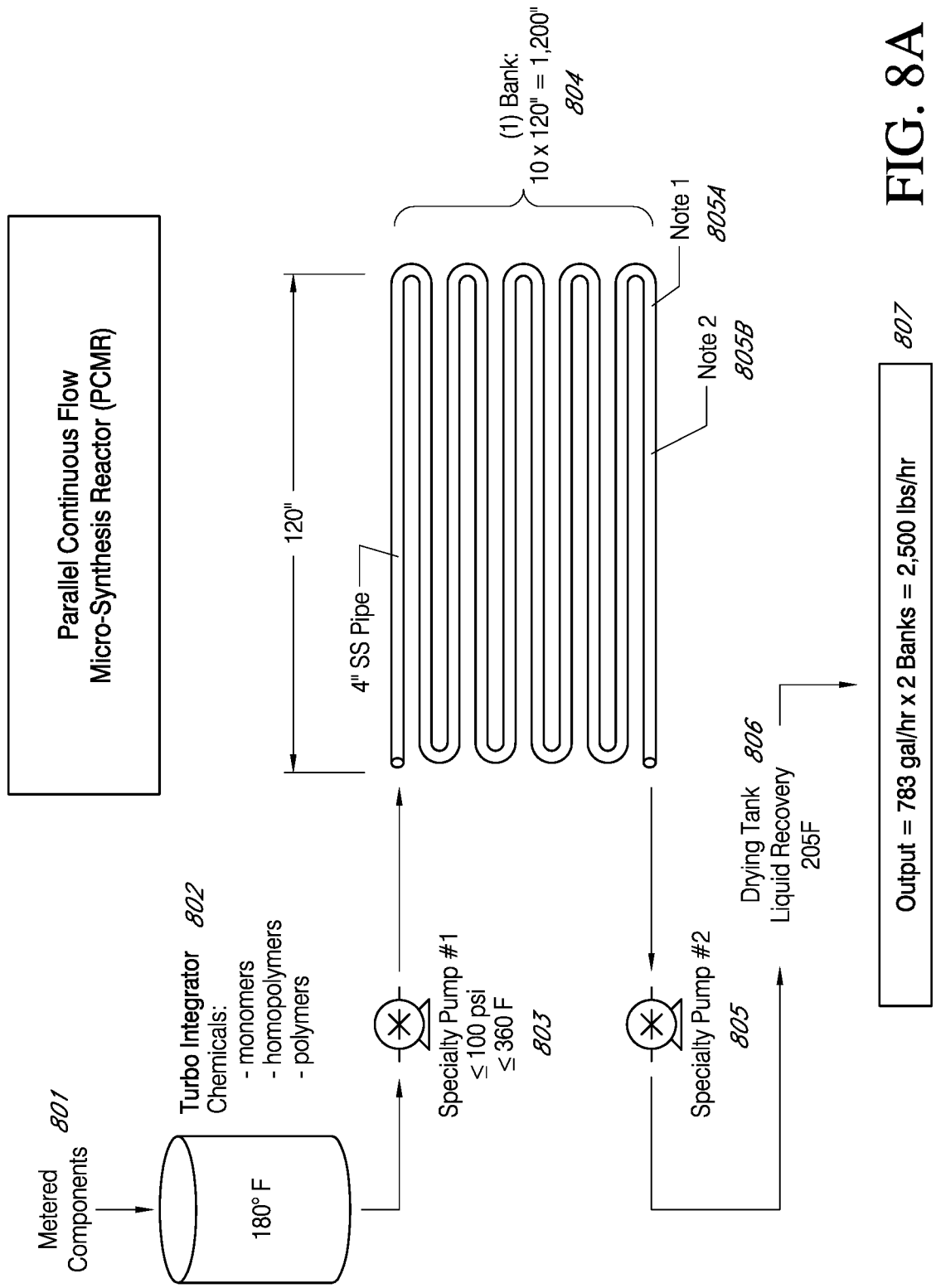
FIG. 8A depicts a Parallel, Continuous-flow, Micro-synthesis Reactor (PCMR).

FIG. 8A depicts a PCMR of one of the embodiments that utilizes a loop-molecular assembly propagation (L-MAP) process by curl gradience amplification. The L-Map Process as described herein integrates CGA technology into an advanced, modular, PCMR platform that possesses unequalled capabilities to create novel as well as re-engineered polymers. The reactor includes a turbo integrator 802 into which metered components 801 are added. These components can include monomers, homopolymers, polymers, and/or other components. In the embodiment depicted, an interlinked substituted rubber can be added to the turbo integrator along with other components for modification of the interlinked substituted rubber, e.g., one or more monomers, oligomers, or polymers to be grafted onto the interlink substituted rubber, or one or more reactants to functionalize the interlinked substituted rubber (e.g., end capping of a polymer chain, ionic substitution, etc.). In the embodiment depicted, the mixture of components is heated to 180° F. and fed into a specialty pump 803 (Specialty Pump #1). The pump depicted is configured to operate at pressures less than or equal to 100 psi, and at temperatures less than or equal to 360° F.; however, if higher pressures and/or temperatures are desirable for the particular mix of components being processed, then a different pump meeting the required pressure and temperature specifications can be substituted. The mixture is then fed by the pump into a bank of pipe 804. To minimize the footprint of the bank, the pipe is shaped in a serpentine configuration, and has a total length of 800 inches. The embodiment depicted includes stainless steel pipe 4 inches in diameter, which is configured into a bank of ten looped pipe segments, the bank having a length of 120 inches. As the mixture passes through the pipe, the components of the mixture react, yielding a re-engineered, elastomeric polymer having a preselected composition and properties. The output of the pipe is directed to a second pump 805 (Specialty Pump #2), which pumps the reacted mixture to a drying tank 806 for liquid recovery (e.g., at 205° F.). The configuration depicted in the embodiment is capable of outputting 783 gal/hr of slurry 807 when a set of two banks are employed. The reactor can be scaled to any suitable configuration. For example, one or more turbo integrators or other mixing devices as are known in the art can be employed, optionally with heating or cooling capability, pressurization, or maintenance of an inert atmosphere. A single turbo integrator can supply one or more banks, or multiple turbo integrators can supply a single bank. One or more pumps can be employed, either in serial to a single bank, in parallel to a single bank, or a single pump can provide multiple banks with appropriate piping or valves. As discussed above, the pumps can be selected based on the desired properties of the mixture to be pumped (temperature, pressure, etc.). In certain embodiments, the mixture from the bank may be employed directly in subsequent processes (e.g., omission of Specialty Pump #2 and/or drying tank from the reactor). While 4 inch stainless steel pipe is employed in a bank, other diameters can advantageously be employed, e.g., 0.25 inches or less to 6 inches or more in diameter, and any suitable pipe length can be employed that allows the components of the mixture sufficient residence time to react to produce a preselected product, e.g., 50 inches or less to 2500 inches or more. In some embodiments it may be desirable to operate multiple banks in a serial configuration, optionally with a pump situated between the banks, e.g., so as to permit longer residence time or use of pumps capable of operating on a reduced pressure. The pipe(s) can be fitted with strategic static mix and chemical injection points to facilitate reaction 804A (FIG. 8A, Note 1) and integrated curl gradience amplification (CGA) ports 804B (FIG. 8A, Note 2). The pipe(s) can also be, partially or entirely, in a controlled thermal space, e.g., a heating or cooling jacket or temperature controlled immersion bath can be employed. Alternatively, the pipe(s) can be exposed to ambient conditions.

Figure 8B:
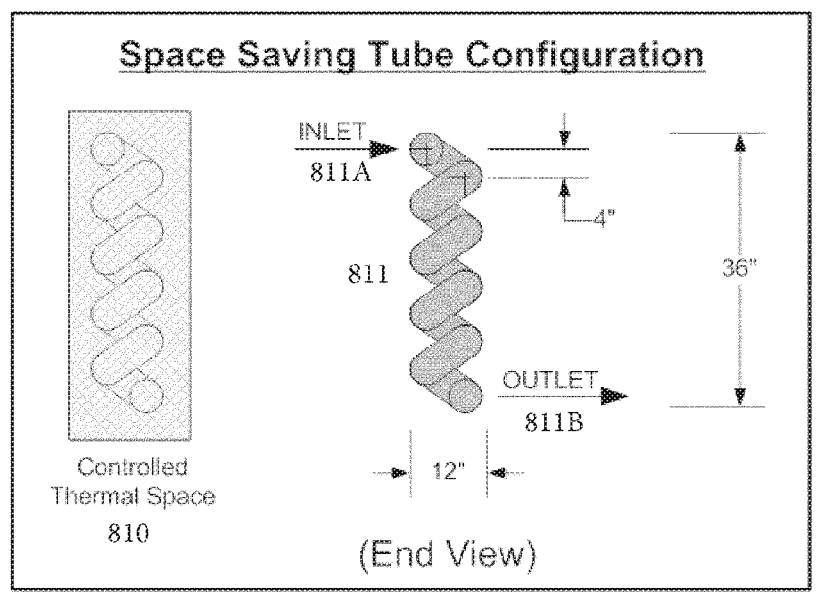
FIG. 8B depicts a space saving tube configuration for use, e.g., in a PCMR.

FIG. 8B depicts a space saving tube configuration. In this configuration, the tube 811 is spiraled, and can be in a controlled thermal space 810. This spiral tube configuration can be extend along an axis from the inlet end 811A to the outlet end 811B, or can be further configured into a serpentine configuration of spiraled tube to reduce the footprint of the bank even further.

The PCMR of the embodiments can advantageously be employed to functionalize or react interlinked substituted product as described herein in a manner similar to how virgin rubber is reacted or functionalized. Graft polymerization, chain end functionalization, and the like can be conducted. The resulting products can be made suitable for use in asphalt binder, tire rubber, specialty rubber products, and the like.

Morphology of PTR

The product streams generated by a method conducted in an alternate batch mode process utilizing a stirred pressure vessel were observed after numerous runs. It was observed that tiny, golden fibers with a cross section of about 0.002 inches-0.005 inches, and of a variable length, were present within the interlinked substituted rubber material. The fibers are expected to only be destroyed by excessive heat (temperatures higher than those employed in the interlinked substitution process described herein, and higher than those characteristic of hot mix processes) and will not dissolve in trichloroethylene (TCE).

The fibers' presence can be expected to not add significant mass to the insoluble component of the sub-micron interlinked substituted rubber material but it is expected to plug a one-micron filter pore, making the actual filter medium less porous, and thereby leading to a false reading of the filtrate concentration quanta. Samples of interlinked substituted rubber material in a form of a slurry were passed through a high temperature-high pressure piston-diaphragm pump and through a high strength, sintered filter capable of handling up to 50,000 psi through a 1.0 micron orifice. This further processing, which is believed to reduce the overall length of the fibers, yielded a smooth mixture capable of passing through a one-micron filter pore. The further processing readily disintegrated the rubber into an easily dispersible, sub-micron moiety, with some release of carbon black.

This fiber component derived from recycled tire may greatly improve the strength of the bond between the asphalt to which the interlinked substituted rubber material is added (e.g., as a binder or adhesive) and the aggregate, thereby improving overall pavement performance, yielding a superior pavement when compared to one prepared from aggregate and asphalt containing virgin rubber.

PTR in Black Master Batch

Interlinked substituted rubber material, generated using lab scale equipment analogous to the apparatus depicted in FIG. 1 under conditions similar to those set forth in FIG. 2, was added to a known-property base black master batch of virgin rubber at an amount of 10 wt. %, (after adjustment for filler materials in the interlinked substituted rubber material). The resulting 10 wt. % mixture was subjected to thermogravimetrical analysis and other testing. The resulting 10 wt. % mixture was observed to be near-equivalent in homogenizable, physical properties to the known-property base black master batch of virgin rubber, such that it will not affect the final performance of a new tire, or can be used in a base black master batch at a higher loading than the upper limit of 3 wt. % that has traditionally been employed for small-particle (200 mesh), fully-vulcanized, ground tire rubber. In other words, the interlinked substituted rubber material was observed to be suitable for use in fabricating tires as the sole rubber source, or it can be used in combination with base black master batch at loadings above 3%, e.g., 4, 5, 6, 7, 8, 9, 10, 15, 20, 25, 30, 35, 40, 45, 50, 55, 60, 65, 70, 75, 80, 85, 90, or 95 wt. % or more.

The interlinked substituted rubber material was observed to be near elemental sulfur-free, to have a morphology similar to composite virgin rubber, to be <50 micron in particle size, with substantial elastomer retention of the carbon black. The material is suitable for use as at least 20% and up to 50, 60%, 70, 80, 90%, or more (e.g., as much as 100%) of the sidewall of new, light truck and auto tires. Such an interlinked substituted rubber material is also suitable for use in membranes and industrial rubber goods.

IPREX Rubber Polymer

InterPenetrating Regenerative Elastomer Xlink (IPREX) Rubber Polymer (IRP) is a microlaminated, anisotropic structural rubber sheet. It is composed of multiple, vacuum-heat fused and cross linked layers, each being in the range of 10-70 microns thick. The material comprises carbon filled, interpenetrating polyisoprene-polybutadiene elastomer chains, regenerative, realigned crosslinks by transverse sulfidic bridges. The individual laminae exhibit a near-zero loop probability and bias-directional, parallel-reptated, intertwined, elastomer backbone structure(s) which, when progressively laid-up during construction at 30-45 degrees to the anisotropic 'grain' of each preceding laminae, produces a finished sheet exhibiting superior torsional strength and resilience to comparable isotropic sheets of similar material and cross-section thickness. Pre-cross linked feedstock is processed into thin laminae through a variable nip, high pressure roll mill. IPREX Rubber may be fabricated in two steps from previously cross linked, black master batch virgin feedstock prepared for tire or other engineered rubber products and/or EOL whole tire scrap which has subsequently been parted into small rubber particles (typically 30 mesh, ambient ground tire rubber), which are then subsequently re-compounded according to predetermined, PRISM Reactor process parameters as described herein. IPREX Rubber may be compounded to form an interpenetrating and cross linked, elastomer network with other elastomers, such as functionalized SiR, for enhanced chemical and heat resistance. IPREX rubber is suitable for use in tire wall construction, code compliant electrical tape and potting compounds, industrial belting and hoses, high temperature fabrics and gaskets, geo-liners, roofing and waterproofing membranes, colloidal suspensions for industrial adhesives, and super-pave, PG hot-melt, asphalt binder modification.

Post-Reactor GTRP-Containing Vehicle Tire Performance

The post-reactor GTRP has a clumpy, non-uniform appearance exiting the reactor. After drying and compounding with cross-link agents and other optional hybrid elastomers, typically accomplished in a high shear, internal mixer such as a twin arm Banbury or sigma blade mixer, the GTRP is passed through a narrow, roll mill nip where it becomes a thin sheet. This thin sheet, unlike conventional, virgin, black master batch (VBMB) elastomer composite compounds, similarly processed, may exhibit an anisotropy in length tensile strength to width tensile strength of up to approx. 3:1. The factors that may contribute to the degree of anisotropy include the reactor-controlled loop probability reduction, manipulation of the degree of crosslink dislocation, and/or reduction of internal mixing time.

Reactor Controlled Loop Probability Reduction

This factor can statistically add, on average, 12.5% by weight of additional, effective elastomer to the resulting matrix, inasmuch as once the same-backbone, methyl carbocation precursor-bonded, sulfuric bridge is dislocated, the elastomer is released to dynamically orient (and remain so) as a reptation-bias, along the lateral axis of compression-travel (which is perpendicular the face of the roll mill nip).

Manipulation of the Degree of Cross Link Dislocation

The resilience of remaining, EOL tire cross-links induce a variable, residual resistance to size reduction during compounding and final sheet preparation, wherein the not-fully dislocated particle resists being flattened by the roll mill pressure. This appendage acts as an anchor, being drug along by that portion of the elastomer matrix that more readily achieves reptate-like dynamics. The effect is a reptate-bias in the lateral direction of compression-travel between the rolls.

Reduction of Internal Mixing Time

Post-reactor, GTRP particle, final particle size reduction is a function of the number of wiping cycles the particle endures within the mixer (e.g., twin arm mixer). Since typically only minimal amounts of additives are employed to prepare the GTRP for milling into a sheet for many applications, excessive high shear is not necessitated except when the taking the clumps into progressively smaller dimensions is desired. This manipulation in mixing time can have a similar, but slightly less pronounced, dragging-anchor-effect to that previously described herein.

Where isotropism is advantageous, the GTRP can be handled in a manner which is the inverse of these three discriminators. However, unlike VBMB, the anisotropic quality can have great advantage in structures which must undergo persistent flexing, yet remain dimensionally stable, such as the sidewall of a vehicle tire.

Treated Rubber for Tire Applications

Industry averages place approx. 15% of the vehicle's operational fuel consumption upon overcoming the rolling resistance of the vehicle tire. Most of that resistance is due to tire squirm as, with each revolution, the tread wanders back and forth in an irregular, sinusoidal pattern to the direction of travel as the tread section comes in contact with the pavement. This distortion is restrained by the resilient, torsional properties of the tire sidewall, transmitted to the solid rim and suspension of the vehicle. Tire manufacturing design and construction utilizes a reinforcement fabric, placed at 15-90 degrees to the vertical, rolling tire plane, which is laminated between the isotropic VBMB to achieve a composite structure that maintains a safe, effective rolling structure. However, it takes significant energy to overcome the broad range of torsional mechanics associated with traveling over a variety of surface conditions at variable speeds.

A 40 mil (~1 mm) thick micro-laminated, GTRP sheet, composed of four 0.010" thick sheets laid-up as a four, micro-ply assembly, with each sub-ply placed at approximately 45 degrees to the succeeding laminate, demonstrates an increase of approximately 30% or more in resistance to torsional distortion as compared to a similarly prepared VBMB micro-laminate. Using quantified foot-pound force, torsional mechanical models, a tire construction utilizing this anisotropic micro-laminate, particularly as a component in the two outer-most laminates of tire construction, where the stress from dimensional radius of distortion is the greatest, predicts rolling resistance reduction per unit of tire carcass weight of between 9.5% and 16%. A ten percent (10%) reduction in tire rolling resistance, based upon current global fuel consumption, equates to an annual savings of over six billion gallons (6,000,000,000 gal) of fuel. Accordingly, the treated rubber of the embodiments is particularly useful in tire applications, e.g., as microlaminated sheets (e.g., 2-100 or more sheets, e.g., 2-20, 2-20, or 2-5 sheets laminated together) for use in tire sidewall applications.

Treated Rubber for High Performance Applications

The rubbers and rubber-containing materials of the various embodiments may be manufactured to meet one or more of the following specifications. In certain embodiments, rubber and rubber goods meeting one or more of the MIL-R specifications listed below are provided. These can include but are not limited to tire tread, tire sidewall, roofing membrane, high dielectric electrical tape, tank lining, reservoir lining, trench lining, bridge underlayment, foundation waterproofing, parking garage waterproofing, hose, belt, molding, or other rubber goods prepared from molded rubber or rubber sheeting (e.g., gaskets, tubing, shock absorbing materials, floor mats and bed liners for vehicles, mats and flooring materials for commercial and residential construction, underlayments for floors, decking, and concrete, sound proofing, etc.) Other products include elasticized bands in clothing and hair ties, dishwashing gloves, toys, jar seals and tires, welcome mats, garden hoses. Other household rubber items include boots, raincoats, pond liners, mattresses and cushions, pillows, grips on garden tools, bathtub plugs, doorstops, earplugs, hot water bottles, aquarium tubing, faucet washers and backing for rugs. Stoppers for lab flasks and vials, chemical resistant mats and pads, prosthetics and other specialized products and equipment can be made from the rubber of the embodiments, as can rubber food and water bowls, chew toys and balls, foam rubber mattress pads, stall mats, elasticized vet wraps, flea collars, shed mitts and rubber combs, mouse pads, keyboards, adhesives and rolling chair wheels, anti-fatigue mats, carpet underlayment, head phone pads and rubber stamps, inflatable beds for camping, playground tiles, rubber ducks, sportswear, scuba suits, vehicle components for civilian and military use; boat, ship, and submarine components for civilian or military use; airplane, passenger plane, and fighter jet components, railcar and train engine components, residential and commercial building products, factory or industrial or manufacturing components, clothing and footwear components.

The treated rubber of the embodiments may be employed in rubber products that meet or exceed one or more of the following ASTM specifications, military specifications (MIL), aerospace material specifications (AMS), and/or other specifications as are employed in various industries using rubber goods.

ASTM C542 (ASTM C 1166 Procedure)—Low Smoke, Low Flame, Low Toxicity Neoprene

ASTM E662—Low Smoke, Low Flame, Low Toxicity Neoprene

ASTM D1330 Grade 1—Premium SBR—Style 22

ASTM D1330 Grade 2—Red Rubber SBR—Style 20

ASTM D2000 1AA 430—Natural Rubber—Style 28

ASTM D2000 1AA 704 Z1 (Z1=75±5 Durometer)—Red Rubber SBR—Style 20

ASTM D2000 M1AA 407—Butyl

ASTM D2000 M1AA 417—Natural Rubber, Pure Gum Floating Natural Rubber, EZ Cut Non-Floating Gum Natural Rubber, Protein Free (Synthetic Polyisoprene) Natural Rubber ASTM D2000 M1AA 503—Commercial EPDM ASTM D2000 M1AA 507—Butyl ASTM D2000 M1AA 517—Natural Rubber ASTM D2000 M1AA 606—Commercial EPDM ASTM D2000 M1AA 607—Butyl ASTM D2000 M1AA 617—Natural Rubber ASTM D2000 M1AA 703 Z1 (Z1=75±5 Durometer)—Specification Grade SBR (Red)

ASTM D2000 M1AA 706—Commercial EPDM

ASTM D2000 M1AA 710—Butyl

ASTM D2000 M4AA 407 A13 B13 C12 F17

ASTM D2000 M4AA 421 F17 G21—Tuff-Stuff® Natural Rubber

ASTM D2000 M4AA 510 A13 B13 C12 F17—ASTM D2000 M4AA Specification Grade (EPDM)

ASTM D2000 M4AA 610 A13 B13 C12 F17

ASTM D2000 M4AA Specification Grade (EPDM)

ASTM D2000 M4AA 710 A13 B13 C12 F17

ASTM D2000 M4AA Specification Grade (EPDM)

ASTM D2000 M2BA 407 C12 F17—Premium EPDM—Style 45

ASTM D2000 3BA 508 C12—Commercial EPDM—Style 40

ASTM D2000 3BA 515 A14 B13 C12 F17—Premium EPDM—Style 45

ASTM D2000 3BA 608 C12—Commercial EPDM—Style 40

ASTM D2000 3BA 615 A14 B13 C12 F17—Premium EPDM—Style 45

ASTM D2000 3BA 708 C12—Commercial EPDM—Style 40

ASTM D2000 3BA 715 A14 B13 C12 F17—Premium EPDM—Style 45

ASTM D2000 3BA 815 A14 B13 C12 F17—Premium EPDM—Style 45

ASTM D2000 1BC 408—Commercial Neoprene—Style 10

ASTM D2000 1BC 508—Commercial Neoprene—Style 10, Matte Finish Neoprene—Style 12

ASTM D2000 1BC 515—Mid-Grade Neoprene—Style 15

ASTM D2000 1BC 609—Commercial Neoprene—Style 10, Matte Finish Neoprene—Style 12

ASTM D2000 1BC 615—Mid-Grade Neoprene—Style 15

ASTM D2000 1BC 710—Commercial Neoprene—Style 10, Matte Finish Neoprene—Style 12

ASTM D2000 1BC 715—Mid-Grade Neoprene—Style 15

ASTM D2000 1BC 810—Commercial Neoprene—Style 10, Matte Finish Neoprene—Style 12

ASTM D2000 M1BC 303—Mid-Grade Neoprene—5100 Series, Premium Neoprene

ASTM D2000 M1BC 403—Mid-Grade Neoprene—5100 Series, Neoprene Molded Slabs

ASTM D2000 M1BC 407—Premium Neoprene ASTM D2000 M1BC 507—Mid-Grade Neoprene—5100 Series, Neoprene Molded Slabs ASTM D2000 M1BC 510—Premium Neoprene ASTM D2000 M1BC 607—Mid-Grade Neoprene—5100 Series, Neoprene Molded Slabs ASTM D2000 M1BC 610—Premium Neoprene ASTM D2000 M1BC 707—Mid-Grade Neoprene—5100 Series, Neoprene Molded Slabs ASTM D2000 M1BC 710—Premium Neoprene ASTM D2000 M1BC 807—Mid-Grade Neoprene—5100 Series, Neoprene Molded Slabs ASTM D2000 M1BC 810—Premium Neoprene ASTM D2000 M1BC 907—Premium Neoprene ASTM D2000 M2BC 407 A14 B14 C12 F17 Z1—(Z1=Fungus Resistance per MIL STD 810, Method 508), Anti-Microbial Neoprene

ASTM D2000 M2BC 410 A14 B14 C12 EO34 F17

ASTM D2000 M2BC Specification Grade (Neoprene)

ASTM D2000 M2BC 510 A14 B14 C12 F17 Z1—(Z1=Fungus Resistance per MIL STD 810, Method 508), Anti-Microbial Neoprene

ASTM D2000 M2BC 510 A14 B14 C12 EO34 F17

ASTM D2000 M2BC Specification Grade (Neoprene)

ASTM D2000 M2BC 610 A14 B14 C12 F17 Z1—(Z1=Fungus Resistance per MIL STD 810, Method 508), Anti-Microbial Neoprene

ASTM D2000 M2BC 610 A14 B14 C12 EO34 F17

ASTM D2000 M2BC Specification Grade (Neoprene)

ASTM D2000 M2BC 710 A14 B14 C12 EO34 F17

ASTM D2000 M2BC Specification Grade (Neoprene)

ASTM D2000 MICA 410—Peroxide Cure EPDM

ASTM D2000 MICA 510—Peroxide Cure EPDM

ASTM D2000 MICA 610—Peroxide Cure EPDM

ASTM D2000 MICA 710—Peroxide Cure EPDM

ASTM D2000 MICA 810—Peroxide Cure EPDM

ASTM D2000 1BF 408 Z1 (Z1=Meets basic requirements of BF materials), Commercial Nitrile (Buna-N)—Style 35

ASTM D2000 1BF 508 Z1 (Z1=Meets basic requirements of BF materials), Commercial Nitrile (Buna-N)—Style 35

ASTM D2000 1BF 609—Commercial Nitrile (Buna-N)—Style 35

ASTM D2000 1BF 710—Commercial Nitrile (Buna-N)—Style 35

ASTM D2000 1BF 810—Commercial Nitrile (Buna-N)—Style 35

ASTM D2000 1BG 610—FDA Nitrile (Buna-N)—Style 37

ASTM D2000 M1BG 407—Premium Nitrile (Buna-N)

ASTM D2000 M1BG 503 Z1 (Z1=45±5 Durometer), WARCO White® FDA Nitrile (Buna-N)

ASTM D2000 M1BG 507—Premium Nitrile (Buna-N)

ASTM D2000 M1BG 607 Z1 (Z1=55±5 Durometer), WARCO White® FDA Nitrile (Buna-N)

ASTM D2000 M1BG 610—Premium Nitrile (Buna-N)

ASTM D2000 M1BG 707 Z1 (Z1=65±5 Durometer), WARCO White® FDA Nitrile (Buna-N)

ASTM D2000 M1BG 710—Premium Nitrile (Buna-N)

ASTM D2000 M1BG 803—WARCO White® FDA Nitrile (Buna-N)

ASTM D2000 M1BG 810—Premium Nitrile (Buna-N)

ASTM D2000 M1BG 910—Premium Nitrile (Buna-N)

ASTM D2000 5BG 613 A14 B14 EO14 EO34 F17—Premium Nitrile (Buna-N)—Style 36

ASTM D2000 5BG 620 A14 B14 EO34—Transformer Oil Nitrile (Buna-N)

ASTM D2000 5BG 720 A14 B14 EO34—Transformer Oil Nitrile (Buna-N)

ASTM D2000 MSBG 407 A14 B14 EO14 EO34 F17—ASTM D2000 MSBG Specification Grade (Nitrile/Buna-N)

ASTM D2000 MSBG 507 A14 B14 EO14 EO34 F17—ASTM D2000 MSBG Specification Grade (Nitrile/Buna-N)

ASTM D2000 MSBG 610 A14 B14 EO14 EO34 F17—ASTM D2000 MSBG Specification Grade (Nitrile/Buna-N)

ASTM D2000 MSBG 710 A14 B14 EO14 EO34 F17—ASTM D2000 MSBG Specification Grade (Nitrile/Buna-N)

ASTM D2000 M1HK 607—Premium Viton® A: 66% Fluorine

ASTM D2000 M1HK 707—Premium Viton® A: 66% Fluorine, Premium Viton® B: 68% Fluorine ASTM D2000 M1HK 807—Premium Viton® A: 66% Fluorine ASTM D2000 M1HK 807 Z1 (Z1=75±5 Durometer), Premium Viton® B: 68% Fluorine MIL-R-900—MIL-R-900 Specification Grade MIL-G-1149—MIL-G-1149 Type 1 Class 1 Grade 50—MIL-R-1149 Specification Grade (Neoprene)

MIL-G-1149 Type 1 Class 2 Grade 50—MIL-R-1149 Specification Grade (SBR)

MIL-G-1149 Type 1 Class 5 Grade 50—MIL-R-1149 Specification Grade (Nitrile/Buna-N)

MIL-R-2765—MIL-R-2765 Specification Grade (Nitrile/Buna-N)

MIL-R-3065 SB 410 F2—MIL-R-3065 SB Specification Grade (Nitrile/Buna-N)

MIL-R-3065 SB 515 F2—MIL-R-3065 SB Specification Grade (Nitrile/Buna-N)

MIL-R-3065 SB 615 F2—MIL-R-3065 SB Specification Grade (Nitrile/Buna-N)

MIL-R-3065 SB 715 F2—MIL-R-3065 SB Specification Grade (Nitrile/Buna-N)

MIL-R-3065 SB 815 F2—MIL-R-3065 SB Specification Grade (Nitrile/Buna-N)

MIL-R-3065 SC 310 F1—MIL-R-3065 SC Specification Grade (Neoprene)

MIL-R-3065 SC 408 Z1 (Z1=350% minimum Elongation), Commercial Neoprene—Style 10

MIL-R-3065 SC 410 F2—MIL-R-3065 SC Specification Grade (Neoprene)

MIL-R-3065 SC 508—Commercial Neoprene—Style 10, Matte Finish Neoprene—Style 12

MIL-R-3065 SC 515 F2—MIL-R-3065 SC Specification Grade (Neoprene)

MIL-R-3065 SC 609—Commercial Neoprene—Style 10, Matte Finish Neoprene—Style 12

MIL-R-3065 SC 615 F2—MIL-R-3065 SC Specification Grade (Neoprene)

MIL-R-3065 SC 710—Commercial Neoprene—Style 10, Matte Finish Neoprene—Style 12

MIL-R-3065 SC 715 F2—MIL-R-3065 SC Specification Grade (Neoprene)

MIL-R-3065 SC 810—Commercial Neoprene—Style 10, Matte Finish Neoprene—Style 12

MIL-R-3065 SC 815 F1—MIL-R-3065 SC Specification Grade (Neoprene)

MIL-R-3065 RS 508 C1—Commercial EPDM—Style 40

MIL-R-3065 RS 515 C1 F1—Premium EPDM—Style 45

MIL-R-3065 RS 608 C1—Commercial EPDM—Style 40

MIL-R-3065 RS 615 C1 F1—Premium EPDM—Style 45

MIL-R-3065 RS 708 C1—Commercial EPDM—Style 40

MIL-R-3065 RS 715 C1 F1—Premium EPDM—Style 45

MIL-R-3065 RS 815 C1 F1—Premium EPDM—Style 45

MIL-R-6855 Class 1 Grade 40—MIL-R-6855 Class 1 Fuel Resistant Specification Grade (Nitrile/Buna-N)

MIL-R-6855 Class 1 Grade 50—MIL-R-6855 Class 1 Fuel Resistant Specification Grade (Nitrile/Buna-N)

MIL-R-6855 Class 1 Grade 60—MIL-R-6855 Class 1 Fuel Resistant Specification Grade (Nitrile/Buna-N)

MIL-R-6855 Class 1 Grade 70—MIL-R-6855 Class 1 Fuel Resistant Specification Grade (Nitrile/Buna-N)

MIL-R-6855 Class 1 Grade 80—MIL-R-6855 Class 1 Fuel Resistant Specification Grade (Nitrile/Buna-N)

MIL-R-6855 Class 2, Grade 30—MIL-R-6855 Class 2 Oil Resistant Specification Grade (Neoprene)

MIL-R-6855 Class 2, Grade 40—MIL-R-6855 Class 2 Oil Resistant Specification Grade (Neoprene)

MIL-R-6855 Class 2, Grade 50—MIL-R-6855 Class 2 Oil Resistant Specification Grade (Neoprene)

MIL-R-6855 Class 2, Grade 60—MIL-R-6855 Class 2 Oil Resistant Specification Grade (Neoprene)

MIL-R-6855 Class 2, Grade 70—MIL-R-6855 Class 2 Oil Resistant Specification Grade (Neoprene)

MIL-R-6855 Class 2, Grade 80—MIL-R-6855 Class 2 Oil Resistant Specification Grade (Neoprene)

MIL-R-21252—MIL-R-21252 Specification Grade (EPDM)

MIL-R-83248C Type 2 Class 1—Fluorozone® Mil-Spec Performance FKM, Military Specification Grade Viton® A, MIL-R-83285

MIL-R-83285 Grade 80—MIL-R-83285 Grade 80 Specification Grade (EPDM)

AMS 3205—Aerospace Material Specification (AMS) Grade Low Temperature (Neoprene)

AMS 3208—Aerospace Material Specification (AMS) Grade Weather Resistant (Neoprene)

AMS 3215—Aerospace Material Specification (AMS) Grade Fuel Resistant (Nitrile/Buna-N)

AMS 3216—Fluorozone® Mil-Spec Performance FKM, Military Specification Grade Viton® A AMS 3301—INFINISIL™ Spec-Grade Performance Silicone AMS 3302—INFINISIL™ Spec-Grade Performance Silicone AMS 3303—INFINISIL™ Spec-Grade Performance Silicone AMS 3304—INFINISIL™ Spec-Grade Performance Silicone FDA Approved Ingredients per 21 CFR 177.2600—FDA Neoprene, WARCO White® FDA Nitrile, Natural Rubber—Style 28, Pure Gum Floating Natural Rubber, Fluorozone® FDA Performance FKM, FDA Viton® A: 66% Fluorine, FDA Red Silicone, FDA White Silicone, FDA Approved Grade TPE (Black), FDA Approved Grade TPE (Neutral)

NSF 51—NSF 51 & NSF 61 Approved Grade TPE

NSF 61—NSF 51 & NSF 61 Approved Grade TPE

A-A-59588 2A & 2B—INFINISIL™ Spec-Grade Performance Silicone

SAE J200 1AA 430—Natural Rubber—Style 28

SAE J200 3BA 508 C12—Commercial EPDM—Style 40

SAE J200 3BA 515 A14 B13 C12 F17—Premium EPDM—Style 45

SAE J200 3BA 608 C12—Commercial EPDM—Style 40

SAE J200 3BA 615 A14 B13 C12 F17—Premium EPDM—Style 45

SAE J200 3BA 708 C12—Commercial EPDM—Style 40

SAE J200 3BA 715 A14 B13 C12 F17—Premium EPDM—Style 45

SAE J200 3BA 815 A14 B13 C12 F17—Premium EPDM—Style 45

SAE J200 1BC 408—Commercial Neoprene—Style 10

SAE J200 1BC 508—Commercial Neoprene—Style 10, Matte Finish Neoprene—Style 12

SAE J200 1BC 609—Commercial Neoprene—Style 10, Matte Finish Neoprene—Style 12

SAE J200 1BC 710—Commercial Neoprene—Style 10, Matte Finish Neoprene—Style 12

SAE J200 1BC 810—Commercial Neoprene—Style 10, Matte Finish Neoprene—Style 12

SAE J200 1BF 608 Z1 (Z1=40±5 Durometer)—Commercial Nitrile (Buna-N)—Style 35

SAE J200 1BF 608 Z1 (Z1=50±5 Durometer)—Commercial Nitrile (Buna-N)—Style 35

SAE J200 1BF 609—Commercial Nitrile (Buna-N)—Style 35

SAE J200 1BF 710—Commercial Nitrile (Buna-N)—Style 35

SAE J200 1BF 810—Commercial Nitrile (Buna-N)—Style 35

AASHTO Grade 2—AASHTO Unsupported Neoprene Bearing Pads—Style 71, AASHTO Unsupported Calendered Neoprene Bearing Pads, AASHTO Unsupported Molded Neoprene Bearing Pads, AASHTO Unsupported Neoprene Bearing Pads—Style 72

AASHTO Grade 3—AASHTO Unsupported Calendered Neoprene Bearing Pads, AASHTO Unsupported Molded Neoprene Bearing Pads Caltrans 51-1.14 Waterstops—Cal-Trans Strip Water Stops Boeing BSS 7239—Low Smoke, Low Flame, Low Toxicity Neoprene Bombardier SMP 800—C—Low Smoke, Low Flame, Low Toxicity Neoprene GMP.E/P.002—General Purpose Grade TPE (Neutral)

GMP.E/P.003—General Purpose Grade TPE (Neutral)

GMP.E/P.004—General Purpose Grade TPE (Neutral)

GMP.E/P.005—General Purpose Grade TPE (Neutral)

GMP.E/P.006—General Purpose Grade TPE (Neutral)

GMP.E/P.007—General Purpose Grade TPE (Neutral)

MSAR20A—General Purpose Grade TPE (Black)

MSAR2OB—General Purpose Grade TPE (Neutral)

MSAR20C—General Purpose Grade TPE (Neutral)

MSAR2OD—General Purpose Grade TPE (Neutral)

MSAR2OE—General Purpose Grade TPE (Neutral)

MSAR30A—General Purpose Grade TPE (Neutral)

MSAR3OB—General Purpose Grade TPE (Neutral)

MSAR40A—Flame Retardant Grade TPE

MSAR40B—Flame Retardant Grade TPE

WSD-M2D379-A1—General Purpose Grade TPE (Neutral)

WSD-M2D380-A1—General Purpose Grade TPE (Neutral)

WSD-M2D381-A1—General Purpose Grade TPE (Neutral)

WSD-M2D382-A1—General Purpose Grade TPE (Neutral)

WSD-M2D441-A—General Purpose Grade TPE (Neutral)

WSD-M2D712-A1—General Purpose Grade TPE (Neutral)

HHP-151F—HHP-151F Cloth-Inserted (CI), Fungus Resistant, Anti-Microbial Neoprene General Electric EA12C11E7—Transformer Oil Nitrile (Buna-N)

ASTM D 178-93 Type 1 Class 2—ASTM Switchboard Type 1 Rubber Matting

ASTM D2000 1AA—Corrugated Matting, Heavy Corrugated Matting, Lightweight KleenRite® Matting, Molded Slabs AASHTO Grade 2—AASHTO Unsupported Molded Neoprene Bearing Pads AASHTO Grade 3—AASHTO Unsupported Molded Neoprene Bearing Pads PRISM™ Rubber Polymer The treated rubber of certain embodiments may be employed in PRISM™ Rubber Polymer, a polybutadiene-butyl rubber hybrid master batch material incorporating Phase Reticulation Induced Sulfidic Metathesis (PRISM). PRISM™ Rubber Polymer may be compounded to have as many as eight additional polymers mixed in, but more typically not more than three additional polymers (e.g., SBR, natural rubber, and/or EPDM), depending upon the end use. PRISM™ Rubber Polymer incorporates an interpenetrating, dual elastomer network where two distinctly different backbone chemistries have been woven together and then cross linked separate from one another. This process achieves superior triaxial and torsional mechanical properties when compared to conventional master batch material for superior stability in all applications. Advantages for PRISM™ Rubber Polymer include a high performance to cost ratio, improved mechanical, chemical and electrical properties, excellent oxidation resistance, significant reduction of carbon footprint, sustainable polymer chemistry. PRISM™ Rubber Polymer is suitable for use in tire sidewall, roofing membranes, high dielectric electrical tape, tank lining, reservoir lining, trench lining, bridge underlayment, foundation waterproofing, parking garage waterproofing, rubber hoses, rubber belts, and rubber molding.

Exemplary Methods, Apparatus and Compositions

Method 1: A method for preparing a modified rubber, comprising: introducing an aqueous slurry comprising vulcanized rubber particles and an organometallic compound into an electromechanical reactor configured to generate a phase space environment with cavitation, so as to induce delamination of a rubber matrix within the vulcanized rubber particles as coordinated with disrupting sulfidic linkages.

Method 2: The method of Method 1, further comprising reestablishing dislocated sulfidic linkages to establish within the matrix sulfur bridge cross linked, re-aligned, laminates.

Method 3: The method of Method 1, wherein delamination is associated with a portion of rigid sulfidic bridges of the vulcanized rubber particles becoming unbound at an original methyl carbocation while remaining tethered at an original allylic carbocation.

Method 4: The method of Method 1, wherein the organometallic compound comprises a metal having octahedral molecular geometry.

Method 5: The method of Method 1, wherein the organometallic compound comprises a metal ion selected from the group consisting of $Co^{2+}$, $Cu^{2+}$, $Ni^{2+}$, $Zn^{2+}$, and $Mn^{2+}$.

Method 6: The method of Method 1, wherein the organometallic compound comprises an organic anion as a ligand to the metal ion.

Method 7: The method of Method 6, wherein the organic anion comprises acetate ion.

Method 8: The method of Method 1, wherein the organometallic compound is copper acetate.

Method 9: The method of Method 1, wherein the organometallic compound is a metal salt that undergoes a phase change from solid to liquid in a range of 115-150° C.

Method 10: The method of Method 1, wherein a temperature in the electromechanical reactor is maintained at ambient by use of a cooling jacket or cooling coils.

Method 11: The method of Method 1, wherein the vulcanized rubber crumbs have a particle size greater than 200 mesh.

Reactor 12: An electromechanical reactor comprising: a rotor having a plurality of slots; and a stator, wherein the electromechanical reactor is configured to create a phase space environment by generating a mixture of entrained air, an organometallic compound, and ground tire rubber particles in a liquid subject to cavitation.

Matrix 13: A rubber-based heterogeneous matrix comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

Matrix 14: The matrix of Matrix 13, further comprising carbon black particles dispersed amongst the laminates.

Matrix 15: The matrix of Matrix 13, wherein the two or more elastomers comprise virgin natural rubber and an elastomer derived from ground tire rubber.

Matrix 16: The matrix of Matrix 13, wherein the two or more elastomers comprise virgin styrene butadiene/butadiene rubber and an elastomer derived from ground tire rubber.

Matrix 17: The matrix of Matrix 13, wherein two of the two or more elastomers have different backbone chemistries.

Matrix 18: The matrix of Matrix 13, wherein the two of the two or more elastomers having the different backbone chemistries are woven together and then cross linked separate from one another.

Sheet 19: A sheet of the rubber-based heterogeneous matrix of Matrix 13.

Sheet 20: The sheet of Sheet 19, exhibiting an anisotropy in length tensile strength to width tensile strength, wherein the anisotropy in length tensile strength to width tensile strength is from 1.1:1 to 3:1.

Laminate 21: A laminate comprising a plurality of the sheets of Sheet 19.

Laminate 22: The laminate of Laminate 21, wherein each of the sheets has a thickness in a range of 10 to 70 microns.

Laminate 23: The laminate of Laminate 21, wherein each of the sheets is vacuum-heat fused and cross linked to an adjacent sheet.

Laminate 24: The laminate of Laminate 21, wherein each of the sheets is oriented 30 to 45 degrees to an anisotropic grain of an adjacent sheet.

Structure 25: A ground tire rubber composite structure having an unbound, reptated internal morphology, wherein a portion of the rigid sulfidic linkages therein are each tethered at an original allylic carbocation and unbound at an original methyl carbocation.

Vulcanized Rubber 26: A vulcanized rubber, wherein a portion of the rigid sulfidic linkages therein are each tethered at an original allylic carbocation and unbound at an original methyl carbocation, and wherein a portion of polymer backbones within the vulcanized rubber are substituted by an acetate moiety.

Interlinked Substituted Rubber 27: An interlinked substituted rubber substantially as described herein.

Article 28: A tire tread, tire sidewall, roofing membrane, high dielectric electrical tape, tank lining, reservoir lining, trench lining, bridge underlayment, wire harness wrap, self-bonding wire harness wrap, shoe soles, rubber boots, electrical tape, foundation waterproofing, parking garage waterproofing, hose, belt, or molding comprising an interlinked substituted rubber product as described herein.

Rubber Tire 29: A rubber tire, wherein from 3% by weight to 15% by weight of the rubber in the tire is prepared by a method substantially as described herein.

Rubber Tire 30: A rubber tire, wherein from 15% by weight to 100% by weight of the rubber in the tire is prepared by a method substantially as described herein.

Tire Tread 31: A tire tread comprising from 10% by weight to 50% by weight of an interlinked substituted rubber substantially as described herein.

Tire Sidewall 32: A tire sidewall comprising from 5% by weight to 100% by weight of an interlinked substituted rubber substantially as described herein.

Asphalt-Rubber Binder 33: An asphalt-rubber binder comprising from 5% by weight to 95% by weight of an interlinked substituted rubber substantially as described herein.

Asphalt Emulsion 34: An asphalt emulsion comprising from 5% by weight to 95% by weight of an interlinked substituted rubber substantially as described herein.

Asphalt Roofing Material 35: An asphalt roofing material comprising from 5% by weight to 95% by weight of an interlinked substituted rubber substantially as described herein.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A rubber-based heterogeneous matrix comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

2. The matrix of claim 1, further comprising carbon black particles dispersed amongst the laminates.

3. The matrix of claim 1, wherein the two or more elastomers comprise virgin natural rubber and an elastomer derived from ground tire rubber.

4. The matrix of claim 1, wherein the two or more elastomers comprise virgin styrene butadiene/butadiene rubber and an elastomer derived from ground tire rubber.

5. The matrix of claim 1, wherein two of the two or more elastomers have different backbone chemistries.

6. The matrix of claim 1, wherein the two of the two or more elastomers having the different backbone chemistries are woven together and then cross linked separate from one another.

7. The matrix of claim 1, in a form of a sheet.

8. The matrix of claim 7, wherein the sheet exhibits an anisotropy in length tensile strength to width tensile strength, wherein the anisotropy in length tensile strength to width tensile strength is from 1.1:1 to 3:1.

9. A laminate comprising a plurality of sheets, wherein each of the sheets comprises a rubber-based heterogeneous matrix comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

10. The laminate of claim 9, wherein each of the sheets exhibits an anisotropy in length tensile strength to width tensile strength, wherein the anisotropy in length tensile strength to width tensile strength is from 1.1:1 to 3:1.

11. The laminate of claim 9, wherein each of the sheets has a thickness of from 10 microns to 70 microns.

12. The laminate of claim 9, wherein each of the sheets is vacuum heat fused and cross linked to an adjacent sheet.

13. The laminate of claim 9, wherein each of the sheets is oriented 30 to 45 degrees to an anisotropic grain of an adjacent sheet.

14. An article selected from the group consisting of a rubber tire, an asphalt-rubber binder, an asphalt roofing material, an asphalt emulsion, a tire tread, a tire sidewall, a roofing membrane, a high dielectric electrical tape, a tank lining, a reservoir lining, a trench lining, a bridge underlayment, a wire harness wrap, a self-bonding wire harness wrap, a shoe sole, a rubber boot, an electrical tape, a foundation waterproofing, a parking garage waterproofing, a hose, a belt, and a molding, the article comprising a rubber-based heterogeneous matrix comprising an interpenetrating network of two or more elastomers, the network comprising sulfur bridge cross linked, re-aligned, intermingled laminates having an average spacing of from 10 nm to 5 microns, wherein each laminate comprises one of the two or more elastomers.

15. The article of claim 14, which is a rubber tire, wherein from 3% by weight to 15% by weight of rubber in the tire is the rubber-based heterogeneous matrix.

16. The article of claim 14, which is a rubber tire, wherein from 15% by weight to 100% by weight of the rubber in the tire is the rubber-based heterogeneous matrix.

17. The article of claim 14, which is a tire tread comprising from 10% by weight to 50% by weight of the rubber-based heterogeneous matrix.

18. The article of claim 14, which is a tire sidewall comprising from 5% by weight to 100% by weight of the rubber-based heterogeneous matrix.

19. The article of claim 14, which is an asphalt-rubber binder comprising from 5% by weight to 95% by weight of the rubber-based heterogeneous matrix.

20. The article of claim 14, which is an asphalt roofing material comprising from 5% by weight to 95% by weight of the rubber-based heterogeneous matrix.

* * * * *